(12) United States Patent
Williams

(10) Patent No.: US 10,687,484 B1
(45) Date of Patent: Jun. 23, 2020

(54) IRRIGATION SYSTEM

(71) Applicant: Christopher Guy Williams, Spokane, WA (US)

(72) Inventor: Christopher Guy Williams, Spokane, WA (US)

(*) Notice: Subject to any disclaimer, the term of this patent is extended or adjusted under 35 U.S.C. 154(b) by 0 days.

(21) Appl. No.: 16/687,364

(22) Filed: Nov. 18, 2019

Related U.S. Application Data

(63) Continuation-in-part of application No. 15/086,570, filed on Mar. 31, 2016, now Pat. No. 10,477,784, and a continuation-in-part of application No. 14/210,488, filed on Mar. 14, 2014, now Pat. No. 9,301,459.

(60) Provisional application No. 61/852,349, filed on Mar. 15, 2013.

(51) Int. Cl.
*A01G 25/09* (2006.01)

(52) U.S. Cl.
CPC .................. *A01G 25/092* (2013.01)

(58) Field of Classification Search
CPC ...... A01G 25/092; A01G 25/90; A01G 25/97; B05B 3/18; B05B 3/12; B05B 17/00
USPC ....... 239/100, 722, 723, 726, 728, 730, 731, 239/733, 739–741, 748–750; 180/385; 700/284
See application file for complete search history.

(56) References Cited

U.S. PATENT DOCUMENTS

| | | | |
|---|---|---|---|
| 2,750,228 A | 6/1956 | Engel | |
| 3,255,969 A | 6/1966 | Stafford | |
| 3,281,893 A | 11/1966 | Ayers | |
| 3,381,893 A | 5/1968 | Smith | |
| 3,444,941 A | 5/1969 | Purtel | |
| 3,463,175 A | 8/1969 | Rogers | |
| 3,831,692 A | 8/1974 | Fry | |
| 4,036,436 A | 7/1977 | Standal | |
| 4,192,335 A * | 3/1980 | Standal | A01G 25/097 239/1 |
| 4,295,607 A | 10/1981 | Noble | |
| 4,330,085 A | 5/1982 | Siekmeier | |
| 4,350,295 A * | 9/1982 | Gheen | A01G 25/09 137/355.21 |
| 4,405,085 A | 9/1983 | Meyer | |
| 4,413,783 A * | 11/1983 | Ostrom | A01G 25/097 239/740 |
| 4,609,147 A * | 9/1986 | Chapman | B05B 3/18 239/735 |

(Continued)

*Primary Examiner* — Justin M Jonaitis

(57) ABSTRACT

A fully automated irrigation system to irrigate regular and irregular shapes of land. The system includes a water delivery pipe assembly configured to travel laterally while irrigating adjacent to a stationary row of spaced access valves supplied by a water main. The system includes a single coupler automated connector configured to supply water to the water delivery pipe assembly. The connector includes a swing arm mounted to and hydraulically connected to the water delivery pipe assembly. The connector includes a valve coupler mounted to the swing arm, the valve coupler configured to raise and lower relative to the swing arm to selectively access water from the water main via the spaced access valves. The connector includes a swing arm length regulator enabling substantially horizontal coupler travel relative to the swing arm. A water conveyance of the connector operably flows water between the valve coupler and the swing arm and maintains connection between the valve coupler and the swing arm during the raise, lower and horizontal travel of the coupler.

20 Claims, 31 Drawing Sheets

(56) References Cited

U.S. PATENT DOCUMENTS

| | | | |
|---|---|---|---|
| 4,877,189 A * | 10/1989 | Williams | ............. A01G 25/097 |
| | | | 239/749 |
| 4,899,934 A | 2/1990 | Krisle | |
| 5,246,164 A | 9/1993 | McCann | |
| 6,431,475 B1 * | 8/2002 | Williams | ............... A01G 25/09 |
| | | | 239/740 |
| 6,726,132 B2 | 4/2004 | Malsam | |
| 8,561,925 B2 | 10/2013 | Korus | |
| 9,386,753 B1 | 7/2016 | Charipar | |

\* cited by examiner

IRRIGATION SYSTEM

CROSS REFERENCE TO RELATED APPLICATION

This is a continuation-in-part of U.S. patent application Ser. No. 15/086,570 titled Irrigation System issued as U.S. Pat. No. 10,477,784 on Nov. 19, 2019 which is hereby incorporated by reference in its entirety. U.S. Pat. No. 10,477,784 is a continuation-in-part of U.S. patent application Ser. No. 14/210,488 titled Irrigation System issued as U.S. Pat. No. 9,301,459 on Apr. 5, 2016 which is hereby incorporated by reference in its entirety. This application claims priority to U.S. Provisional Application Ser. No. 61/852,349 filed Mar. 15, 2013 and titled Irrigation System which is hereby incorporated by reference in its entirety.

BACKGROUND

U.S. Pat. No. 6,431,475 issued to Williams discloses an improved affordable and reliable automated connector forwarding for traveling linear-move sprinkler irrigation (a.k.a. lateral-move irrigation). For valve coupling and de-coupling as disclosed in U.S. Pat. No. 6,431,475, transport wheels are configured to raise and lower respectively relative to a swing arm. Raising the transport wheels lowers the swing arm and a coupler body providing for the coupler body to couple to an access valve. U.S. Pat. No. 6,431,475 to Williams also discloses a pair of swing-jointed pipes for conveying water from the coupler body to the swing arm.

BRIEF DESCRIPTION OF THE DRAWINGS

A form of the invention is illustrated in the accompanying drawings in which.

DETAILED DESCRIPTION

Embodiments of the present invention accomplishes coupler body coupling to and de-coupling from an access valve by lowering and raising (respectively) the coupler body instead of the transport wheels. The transport wheels are fixed in position. The benefits include a simpler, lighter and more affordable automated coupler and further include increased ground clearance underneath the swing arm.

One embodiment of the present invention provides to raise and lower a coupler body to couple to an access valve, said raise and lower relative to a swing arm, said raise and lower employing a vertical coupler and rails travel.

Another embodiment, the present invention provides to raise and lower a coupler body to couple to an access valve, said raise and lower relative to a swing arm, said raise and lower employing a vertical coupler travel.

In another embodiment, the present invention accomplishes water conveyance from the coupler body to the swing arm employing a directed flexible conduit. In another embodiment, the present invention accomplishes water conveyance from the coupler body to the swing arm employing a flexible conduit with pivoting conduit. In another embodiment, the present invention accomplishes water conveyance from the coupler body to the swing arm employing a conduits with flexible conduit. In another embodiment, the present invention accomplishes water conveyance from the coupler body to the swing arm employing a caged flexible conduit. In another embodiment, the present invention accomplishes water conveyance from the coupler body to the swing arm employing a trolley supported conveyance. The benefits of these embodiments include energy efficiency, reliability and affordability when maintaining hydraulic connection between the coupler body and the swing arm during the raise, lower and horizontal travel of the coupler body. (These examples overcome energy loss attributed to the some five 90-degree flow diversions of the swing-jointed pipes disclosed in U.S. Pat. No. 6,431,475.)

Figure 18:
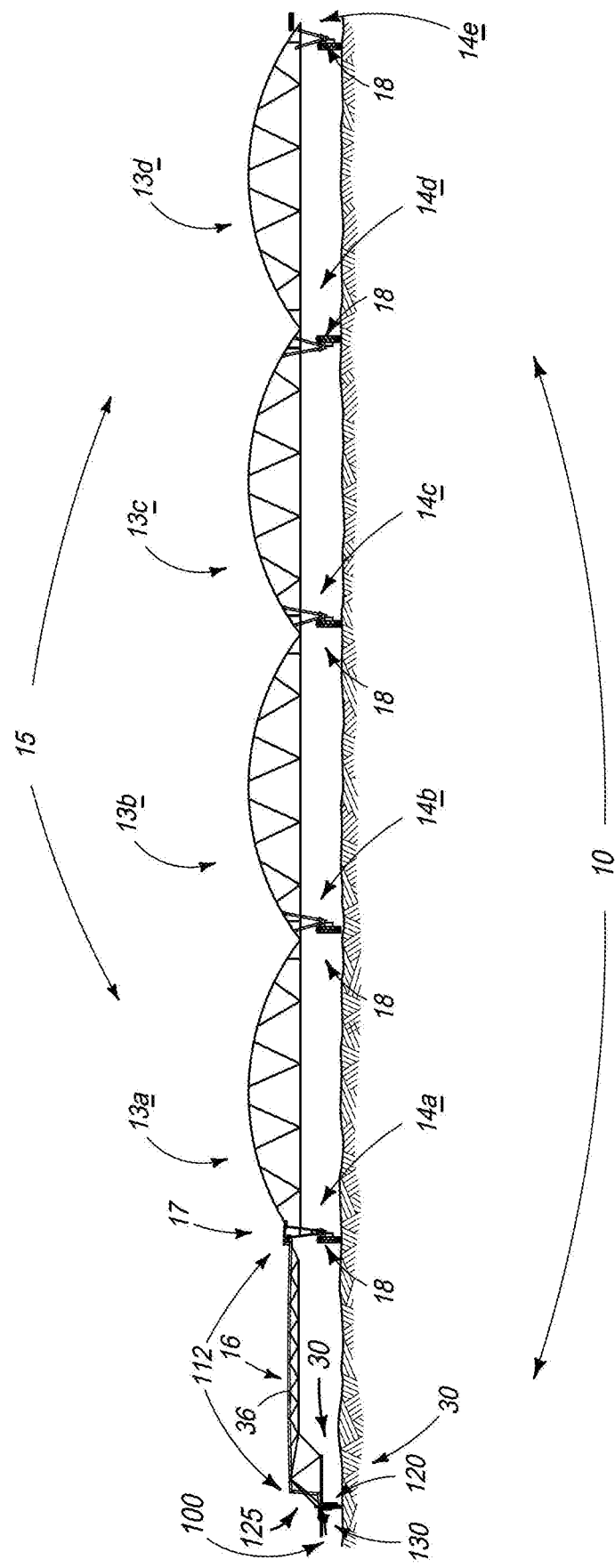
FIG. 18 is a side elevation view of a single coupler automated connector pivotably mounted at one end to a linear-move water delivery pipe assembly.
Figure 19:
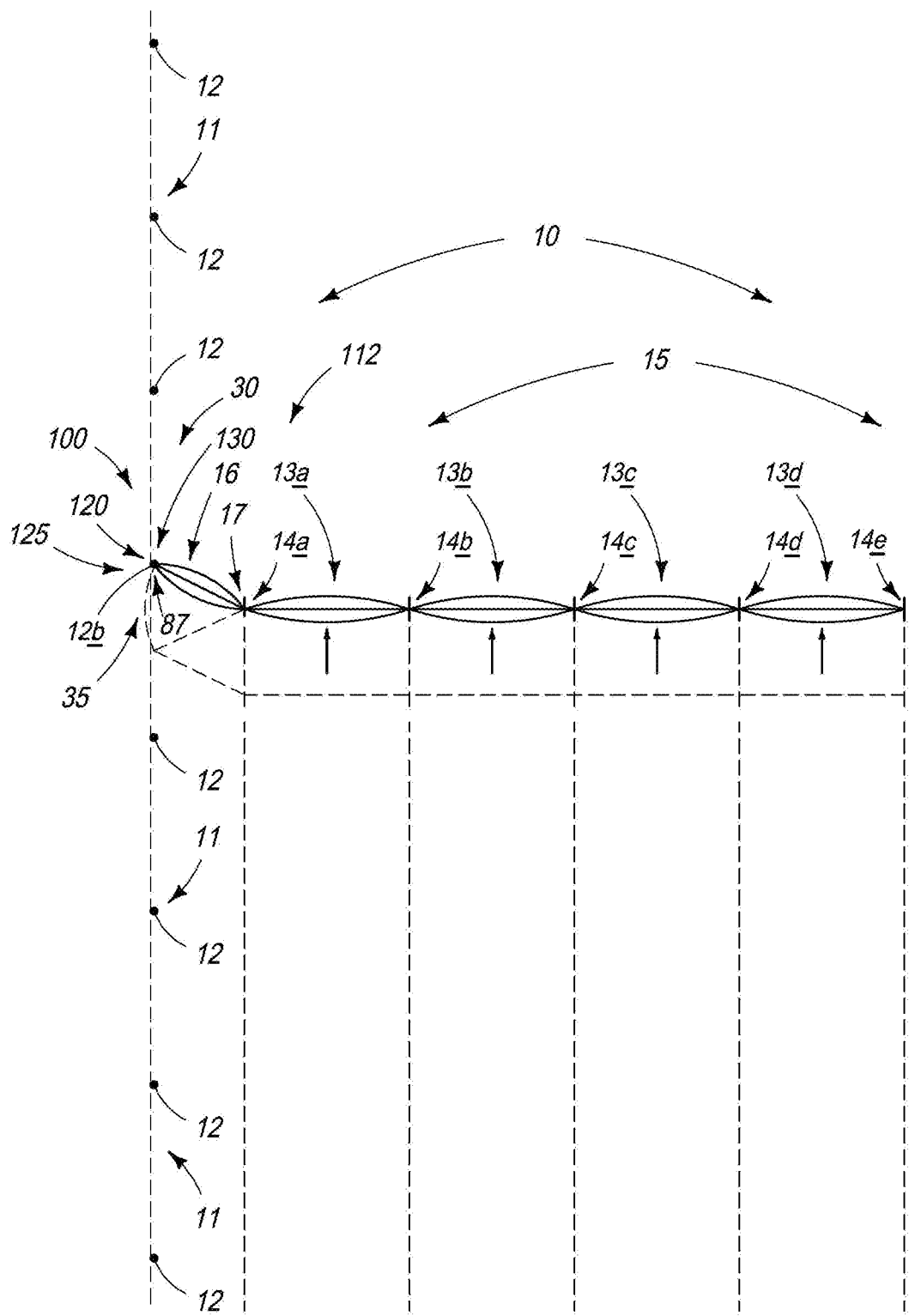
FIG. 19 is a diagrammatic top plan view depicting the single coupler automated connector forwarding connection from one access valve to a next access valve, the automated connector pivotably mounted at one end to a linear-move water delivery pipe assembly.

The present invention generally relates to linear-move irrigators. Examples of the present invention, referred to herein as a linear-move irrigation system 10 can employ a linear-move water delivery pipe assembly 15 and a connector 25 as best illustrated in FIGS. 18 and 19. Linear-move delivery pipe assembly 15 functions to deliver irrigation water to cropland. A side elevation view of an example of delivery pipe assembly 15 is illustrated in FIG. 18. The exemplary pipe assembly 15 comprises one or more lengths of trussed delivery pipe 13 mounted atop movable carts 14 forming a linear series of trussed water delivery pipes as illustrated. A drive 18 on each cart 14 maintains linear alignment of the water delivery pipes 13 while powering each cart 14 to travel in a direction perpendicular to the lengths of water delivery pipe 13. A water applicator such as rotator sprinklers or spray nozzles or any other applicator type is connected along the lengths of water delivery pipe 13 for selectively applying water supplied by the trussed water delivery pipes 13 on to the field surface.

Figure 1:
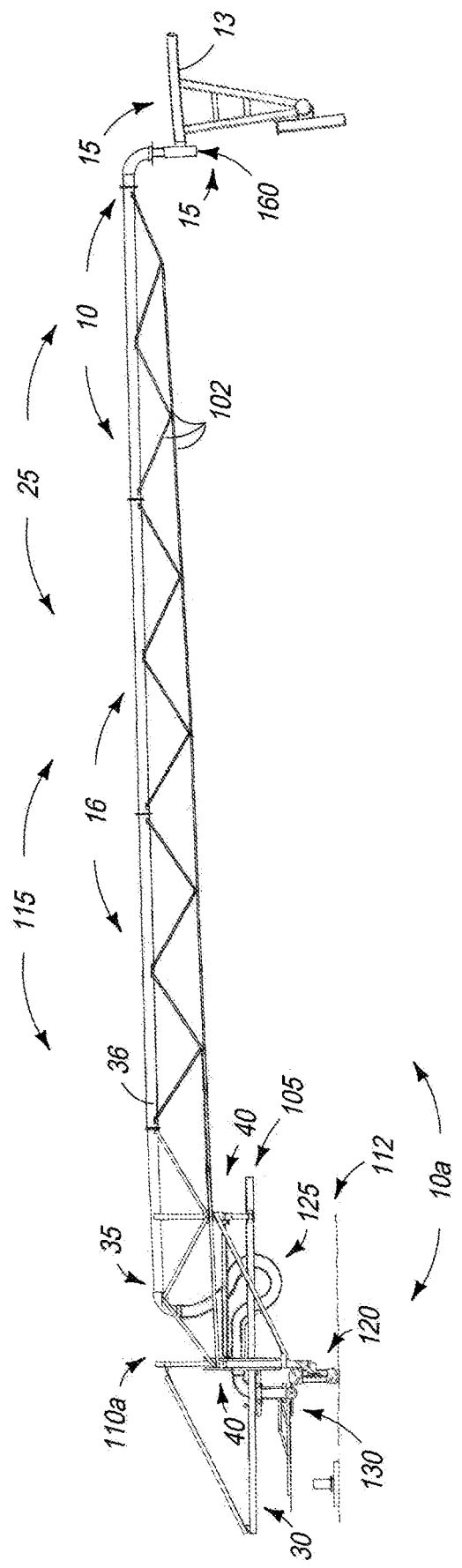
FIG. 1 is a side elevation view of a first embodiment of an automated connector of the present invention attached to a water delivery pipe.

Connector 25 functions to hydraulically connect a linear-move water delivery pipe to a water supply. Connector 25 can comprise an automated connector 115 (FIG. 1). Connector 25 can be a manual connector for example, a hose manually moved along and manually connected to a series of access valves such as the connector employed on today's hose-pull linear-move irrigators. Connector 25 can comprise a connector that sucks water from a ditch such as employed on today's ditch-fed linear-move irrigators. Connector 25 can comprise any connector that supplies water to a linear-move irrigator.

Automated connector 115 functions to automatically supply water to a linear-move irrigator. Connector 115 can comprise a dual coupler automated connector. As an example of a dual coupler automated connector, two couplers are employed and water flow from a water main is maintained through at least one of the two being connected to the water main at any one time thus accomplishing continuous flow from main to irrigator.

Automated connector 115 can comprise a single coupler automated connector 112. As an example of a single coupler automated connector 112, one coupler is forwarded along a water main to deliver water from the main to a traveling linear-move irrigator, when said one coupler is being moved between access valves, flow to the irrigator is temporarily interrupted. Embodiments of irrigation system 10 herein disclosed comprise automated mainline connector 115 comprising a single coupler automated connector 112.

Single coupler automated connector 112 can comprise one or more of: a swing arm 16, a transporter 120, a valve coupler 130, a swing arm length adjuster 30, a pivoting ground support 100 and a water conveyance 125.

Figure 2:
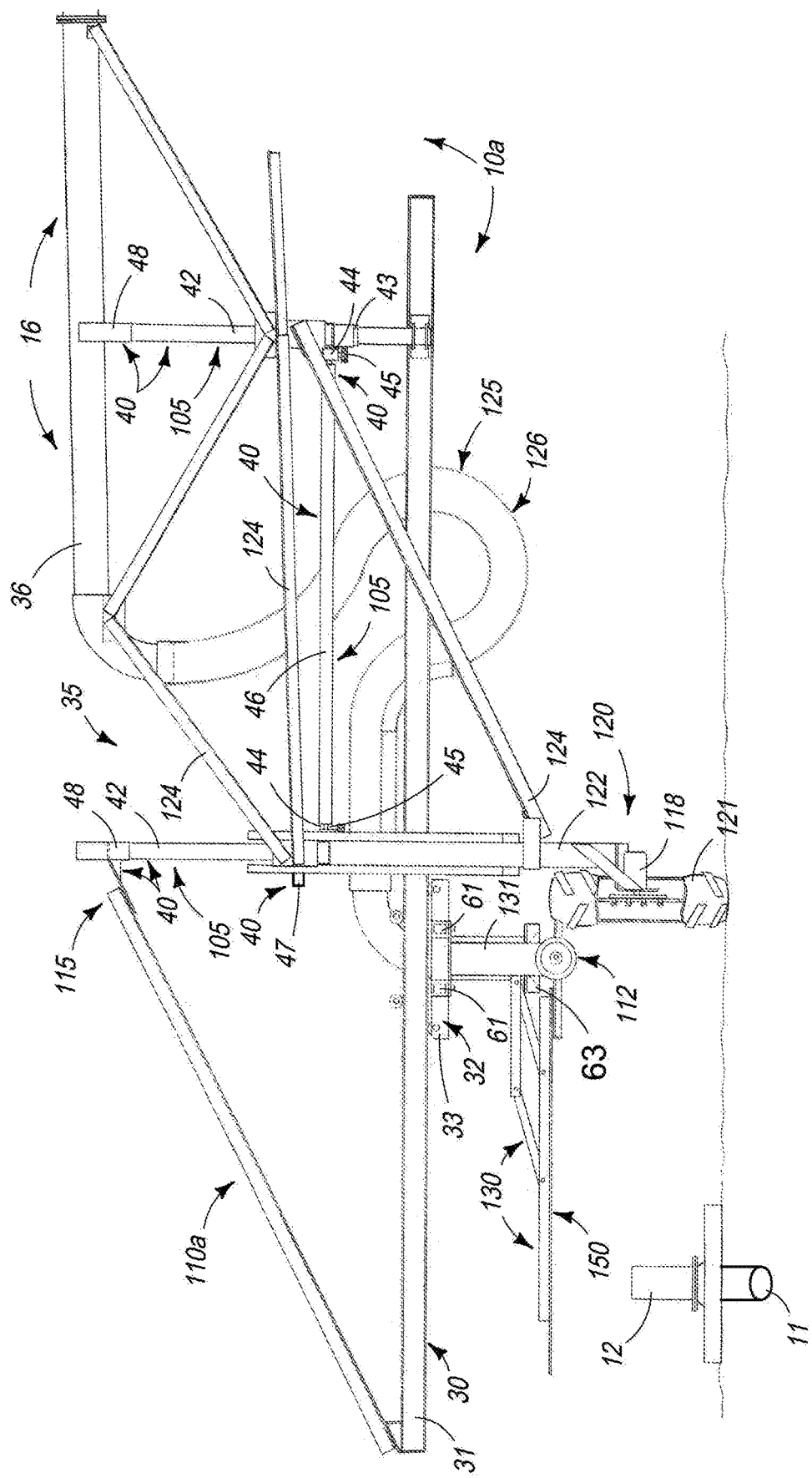
FIG. 2 is a side elevation enlarged view of the automated connector of FIG. 1 showing an outer end of a swing arm sporting a transporter, a valve coupler having a coupler body, a swing arm length adjuster and a water conveyance. The valve coupler including a vertical coupler with rails travel.
Figure 3:
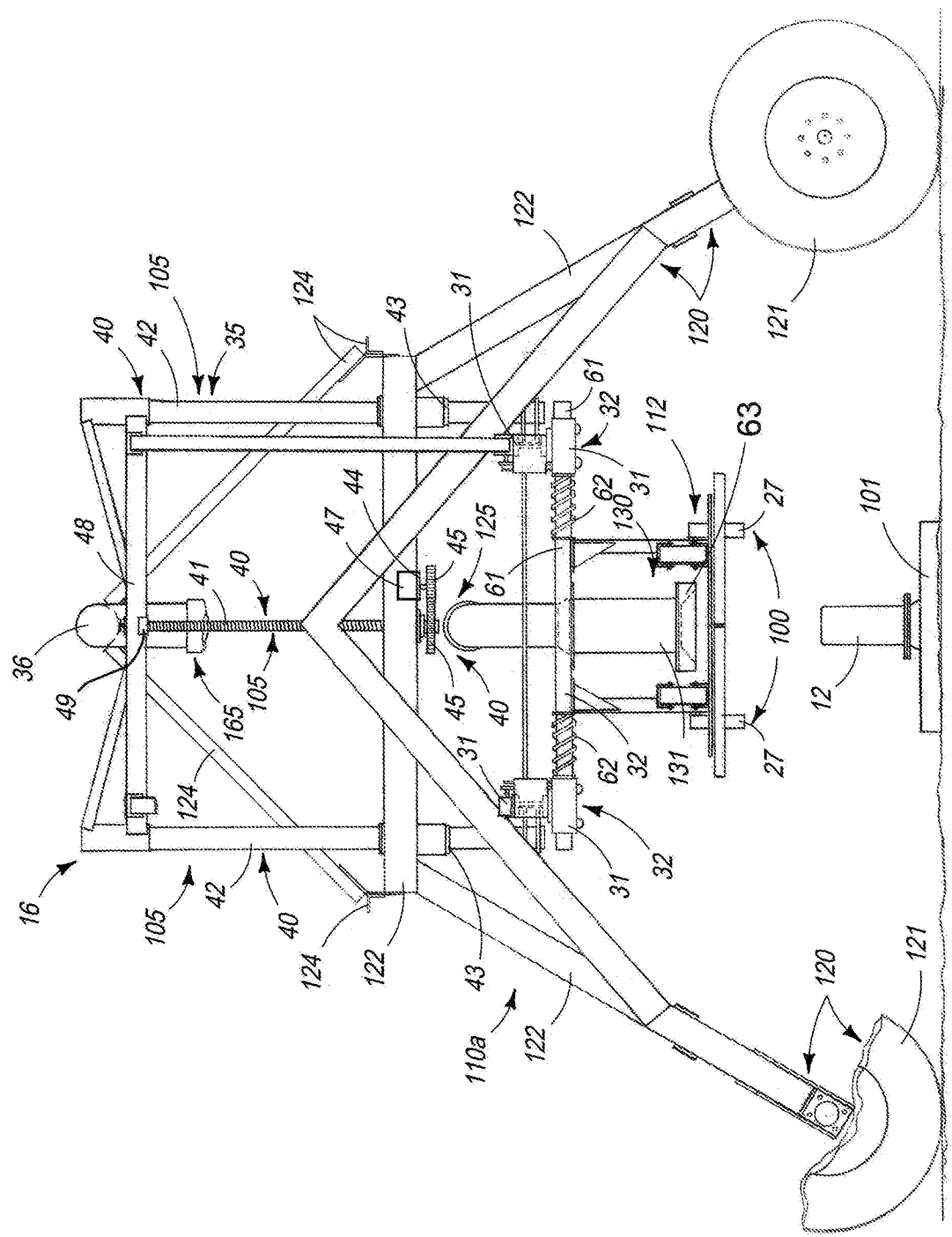
FIG. 3 is an end elevation view of the apparatus illustrated in FIG. 2.

Swing arm 16 functions to pivotably forward the water main connection. One example of swing arm 16 is illustrated in FIGS. 1 through 3. The exemplary swing arm 16 is coupled at one end to a water turbine 160 (see FIG. 1) such that arm 16 is enabled to pivot vertically and especially horizontally relative to the turbine 160 (and thus relative to the delivery pipe assembly 15) to facilitate transport of valve coupler 130 from one access valve to the next, said transport illustrated in FIG. 19 and described later on. Turbine 160 is attached to a delivery pipe 13 of delivery pipe assembly 15. (Swing arm 16 attached via a pivot 17, pivot 17 in place of turbine 160, to a delivery pipe 13a of delivery pipe assembly 15 is illustrated in FIG. 18.) The other end of swing arm 16 (opposite the end coupled to turbine 160) sports transporter 120, valve coupler 130, swing arm length adjuster 30 and water conveyance 125 (said end sporting transporter 120 etc. is hereafter referred to as swing arm outer end 35). Further, the exemplary swing arm 16 includes a supply pipe 36 for flowing water and a trussing 102 as illustrated. (Swing arm 16 can be substantially as described in U.S. Pat. No. 6,431,475 and can be mounted to a water delivery pipe assembly 15 as illustrated in U.S. Pat. No. 6,431,475, or can be other. U.S. Pat. No. 6,431,475 is hereby incorporated by reference in its entirety.)

Transporter 120 functions to transport between access valves. An example of transporter 120 is illustrated in FIGS. 2 and 3. The exemplary transporter 120 transports valve coupler 130 from one of an access valve 12 to a next successive access valve 12 (illustrated in FIG. 19, described further later). (Access valve 12 can be a poppet style valve and can be as described for access valve 12 in U.S. Pat. No. 6,431,475 and can be oriented in a farm field as described in FIGS. 16a through 16d and 17a through 17d in said patent.) The exemplary transporter 120 includes two of a transport wheel 121, a leg frame 122, two of a wheel motor 118 and six of a support strut 124. Leg frame 122 mounts to supply pipe 36 of swing arm 16 via support struts 124 as illustrated. Each motor 118 mounts between a bottom end of one of two legs of leg frame 122 and one of the two of wheel 121 as illustrated such that each wheel 121 can function to ground support outer end 35. When each wheel 121 is ground supporting outer end 35, each of the two of motor 118 can then be employed to propel the associated wheel 121 to thus transport the swing arm outer end 35.

Valve coupler 130 functions to connect to and disconnect from a water main. An example of coupler 130 is illustrated in FIGS. 2 and 3. The exemplary coupler 130 opens valve 12 employing the available weight at swing arm outer end 35 and can accomplish opening (and closing) said valve, including detection of and alignment with said valve, as described in U.S. Pat. No. 6,431,475. The exemplary coupler 130 includes a coupler body 131, two of a horizontal tube 61, four of an adjuster spring 62, an alignment cone 63 and a V-catcher 158. Coupler 130 is configured to selectively connect and disconnect coupler body 131 to and from (respectively) an access valve 12 consequently connecting to and disconnecting from (respectively) a water main 11 (main 11 illustrated in FIG. 2). When connected to an access valve 12, body 131 is thus enabled to receive water from main 11 via the access valve 12.

Each of the two of horizontal tubes 61 is affixed at opposite sides of coupler body 131 (the tubes extend generally horizontally and generally parallel to each other with the coupler body affixed at the middle of their length and between them). Each of the two of tube 61 is mounted at each end to one of the two of a trolley roller assembly 33 (assembly 33 described below). Each assembly 33 is configured to allow the respective end of each of tube 61 to slide generally horizontally and perpendicular to the travel of each assembly 33 along the respective rail 31.) Each adjuster spring 62 is mounted to reside inward of a respective assembly 33 and outward of body 31 positioning body 131 centered between the two assemblies 33. Springs 62 of valve coupler 130 maintain body 131 centered between the two trolley assemblies 33 prior to contact with valve 12 thus reserving sufficient travel of horizontal travel of tubes 61 (relative to assemblies 33) to enable alignment when downward travel of alignment cone 63 engages the valve 12, said alignment along the axis essentially perpendicular to rails 31. (Said reserved travel is also employed when V-catcher 158 is pushed against the valve 12 to align cone 63 to the valve 12 prior to said downward travel. Cone 63 is attached at the bottom of coupler body 131. V-catcher 158 is attached to support structure of ground support 100 and resides below cone 63, support 100 described below.) Assemblies 33 are allowed to free float along rails 31 to enable alignment with valve 12 via alignment cone 63 (as well as via V-catcher 158) along the axis parallel to rails 31.

Figure 4:
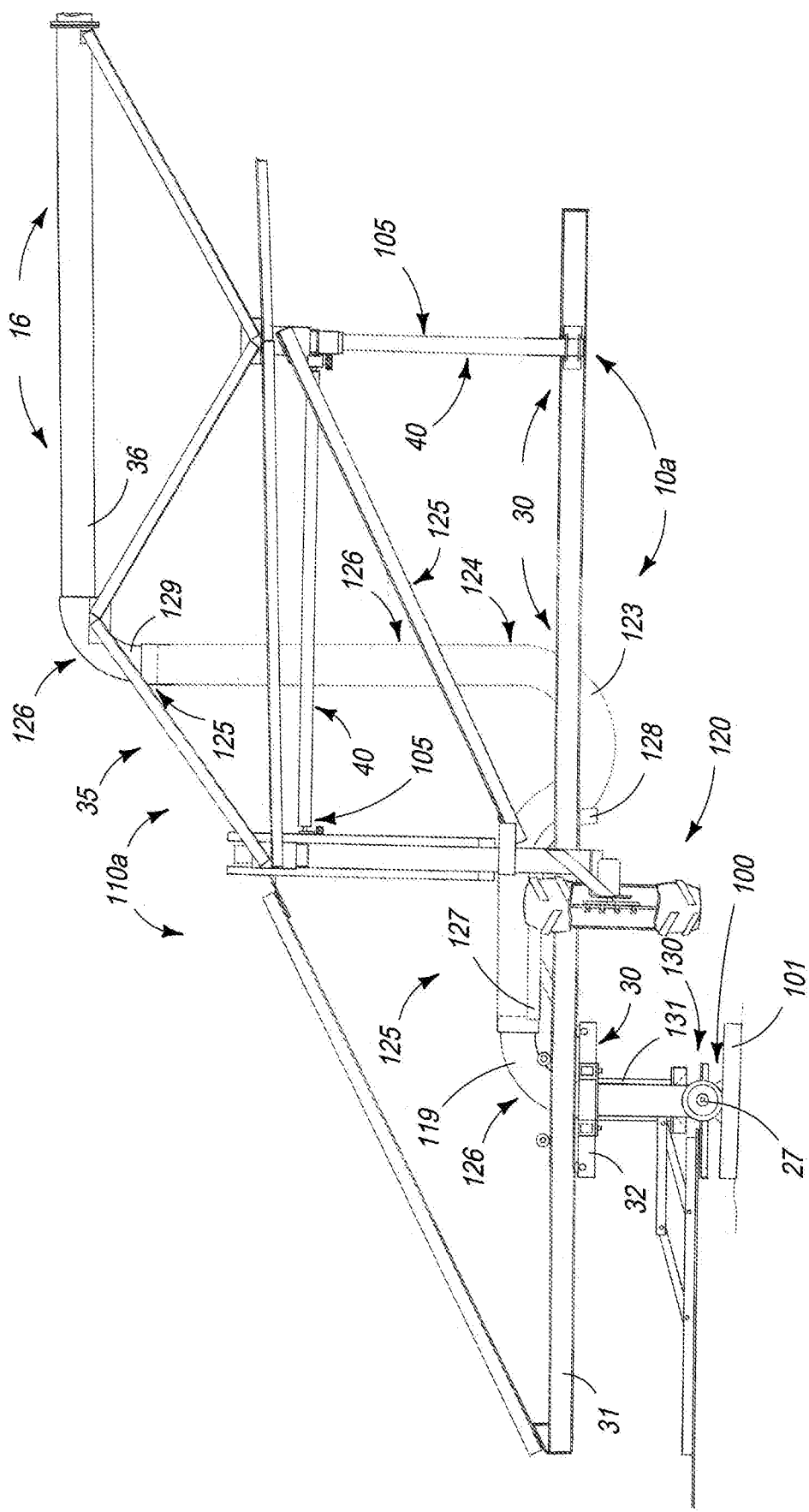
FIG. 4 is a view of the apparatus illustrated in FIG. 2 wherein the coupler body of the valve coupler has been lowered onto an access valve.

Swing arm length adjuster 30 functions to accommodate the varying distance between a stationary water supply and a traveling linear-move irrigator. An example of swing arm length adjuster 30 is illustrated in FIGS. 2 and 3. The exemplary length adjuster 30 includes two of a rail 31 and a trolley 32. Each rail 31 is positioned parallel to the other rail 31 (and parallel to supply pipe 36). Trolley 32 is configured to travel along the length of rails 31. Trolley 32 includes two of a trolley roller assembly 33. One assembly 33 is movably mounted to one of rails 31 and the other assembly 33 is movably mounted to the other rail 31 such that each assembly is enabled to travel along the length of the respective rail. Coupler body 131 of valve coupler 130 is attached to trolley 32 via horizontal tubes 61 and springs 62 as described above. Travel of trolley 32 along rails 31 thus provides for coupler body 131 to translate between an end of rails 31 closest to pipe assembly 15 and an end of rails 31 farthest from pipe assembly 15. Said translation provides to compensate for the variable distance between body 131 and pipe assembly 15 when pipe assembly 15 travels across a field in a substantially straight line. (Swing arm length adjuster can be substantially as described in U.S. Pat. No. 6,431,475.) Pivoting ground support 100 functions to provide ground support of the swing arm outer end and to enable pivoting of the swing arm outer end. An example of support 100 is best illustrated in FIG. 4. The exemplary support 100 includes two of a ground support wheel 27. Each of the two of wheel 27 mounts an axle welded to a support 28. Each support 28 is attached to and extends downward from trolley 32 as shown. Upon valve coupler 30 fully lowering coupler body 131 onto an access valve 12 (thus opening the poppet style valve) the two of wheel 27 contact a concrete pivot pad 101 poured around said access valve 12. Due to said contact with pad 101, further lowering motion by coupler 30 results not in body 131 lowering but rather causes outer end 35 to raise and each of the two of transport wheel 121 to raise off the ground. (With wheels 121 off the ground, trolley 32 is free to travel along rails 31 unimpeded by ground contact of wheels 121.) Travel of pipe assembly 15 (irrigation travel) causes swing arm 16 to rotate substantially horizontally causing coupler body 131 and each wheel 121 to rotate about access valve 12 (travel of pipe assembly 15 also causes trolley 32 to translate along rails 31). (Pivoting ground support 100 can be substantially as described in U.S. Pat. No. 6,431,475. Support 100 can be an apparatus that provides ground support in combination with a separate apparatus that enables pivoting of outer end 35.)

Figure 5:
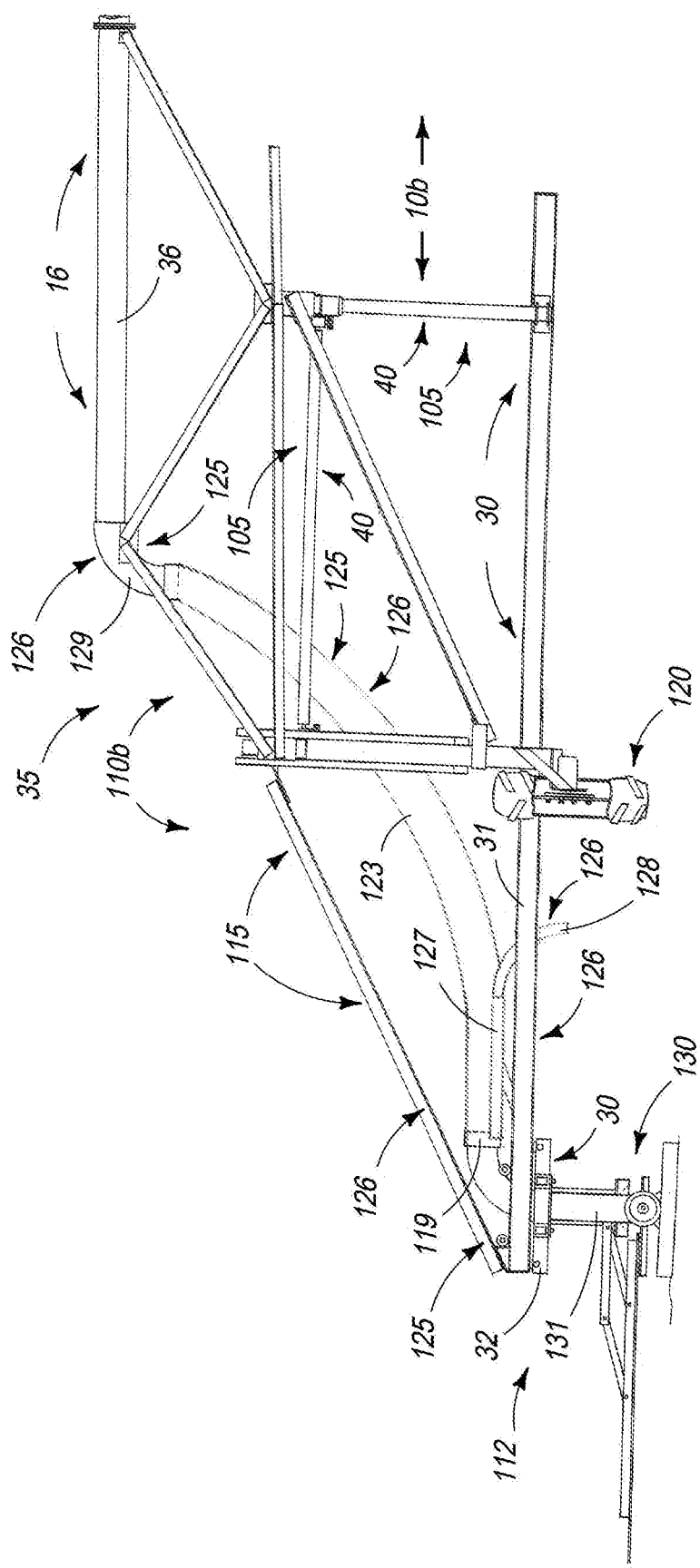
FIG. 5 is a view of the apparatus illustrated in FIG. 4 wherein the coupler body has been positioned outermost along the swing arm length adjuster to illustrate the orientation of a bendable hose of the water conveyance.
Figure 6:
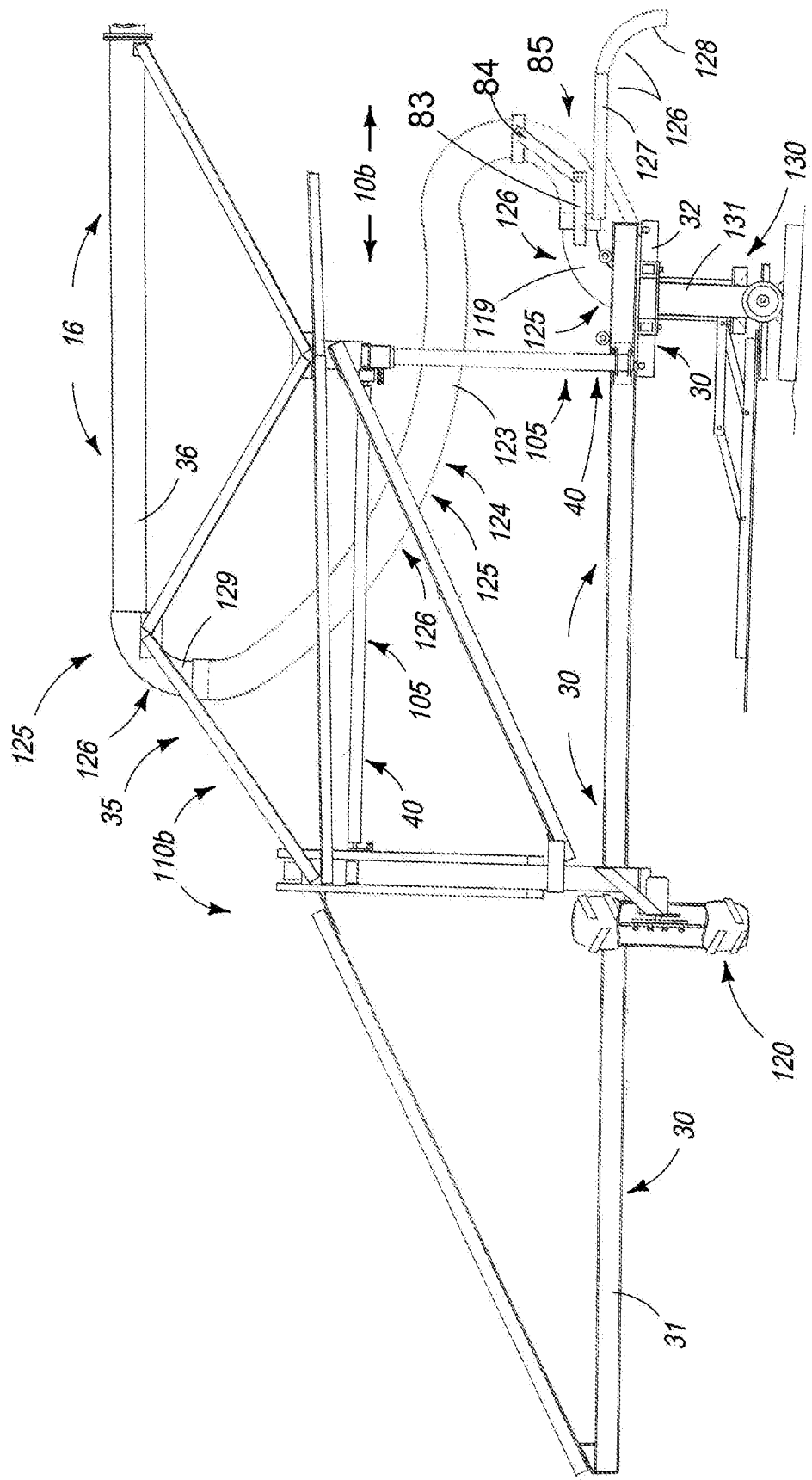
FIG. 6 is a view of the apparatus illustrated in FIG. 5 wherein the coupler body has been positioned innermost along the swing arm length adjuster to illustrate the orientation of the bendable hose.
Figure 7:
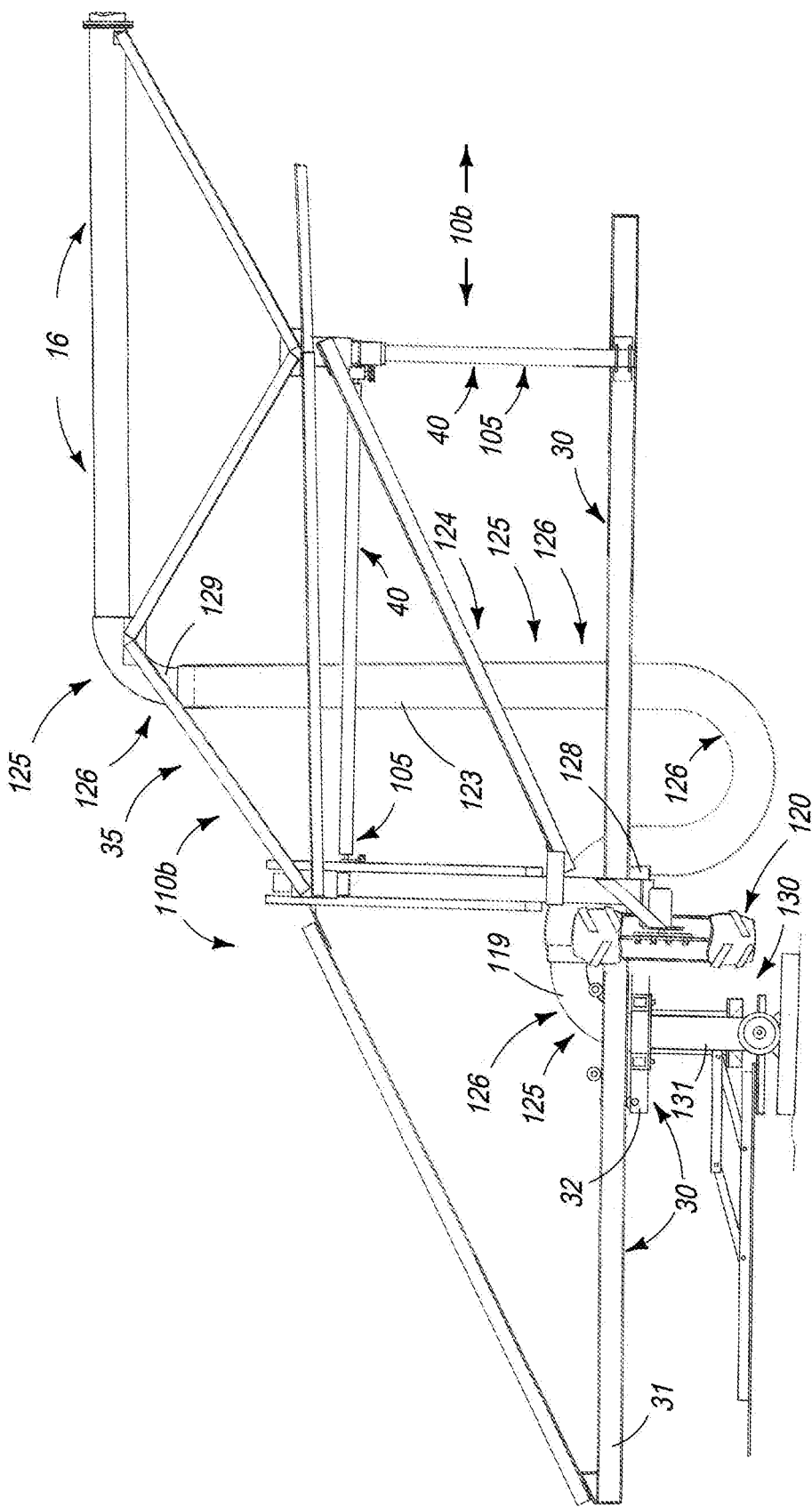
FIG. 7 is a view similar to that of the apparatus illustrated in FIG. 4 showing water conveyance including a bendable hose absent a horizontal support.
Figure 8:
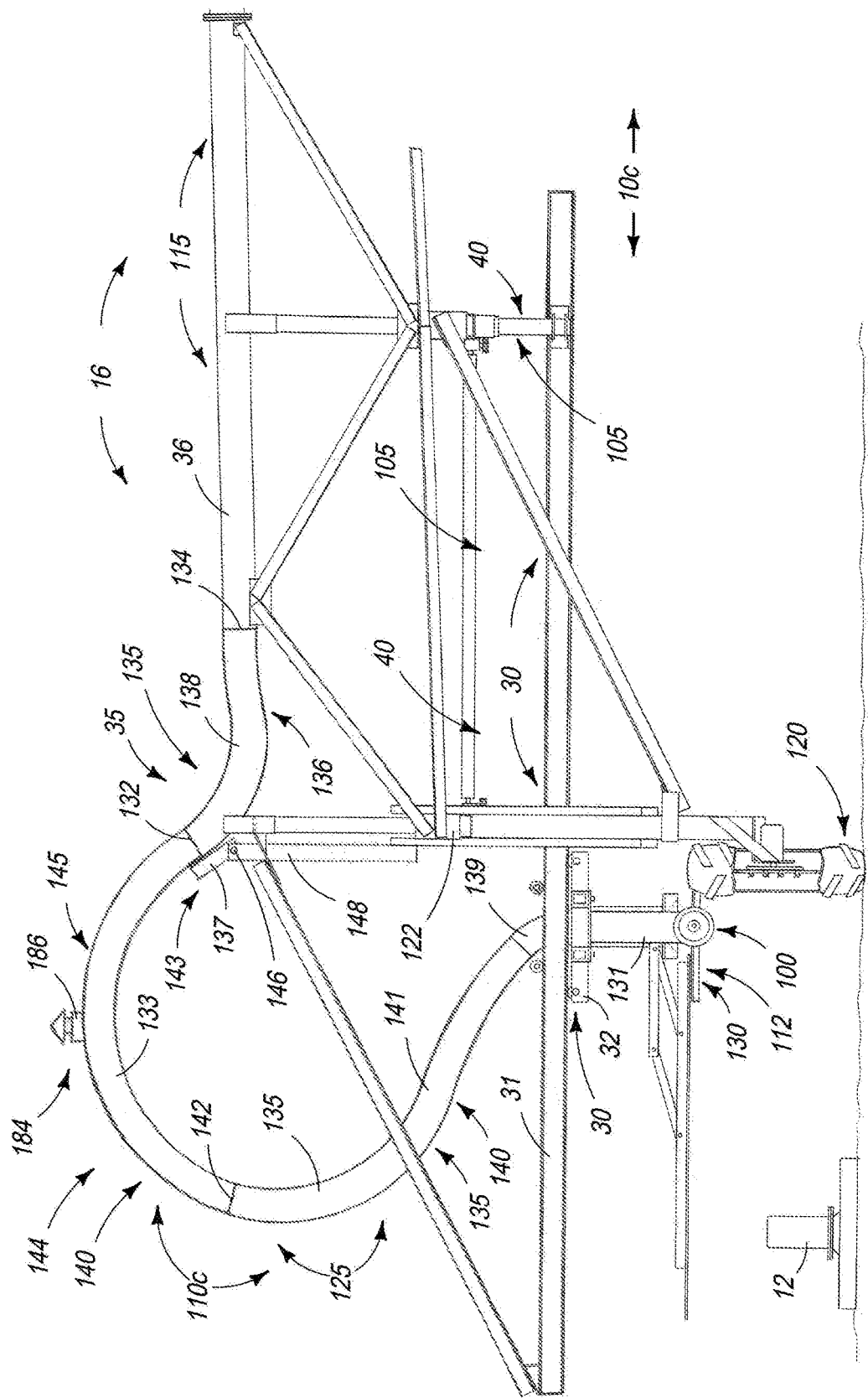
FIG. 8 is a view of the apparatus illustrated in FIG. 2 with the exception that the water conveyance includes a flexible conduit with pivoting conduit.
Figure 9:
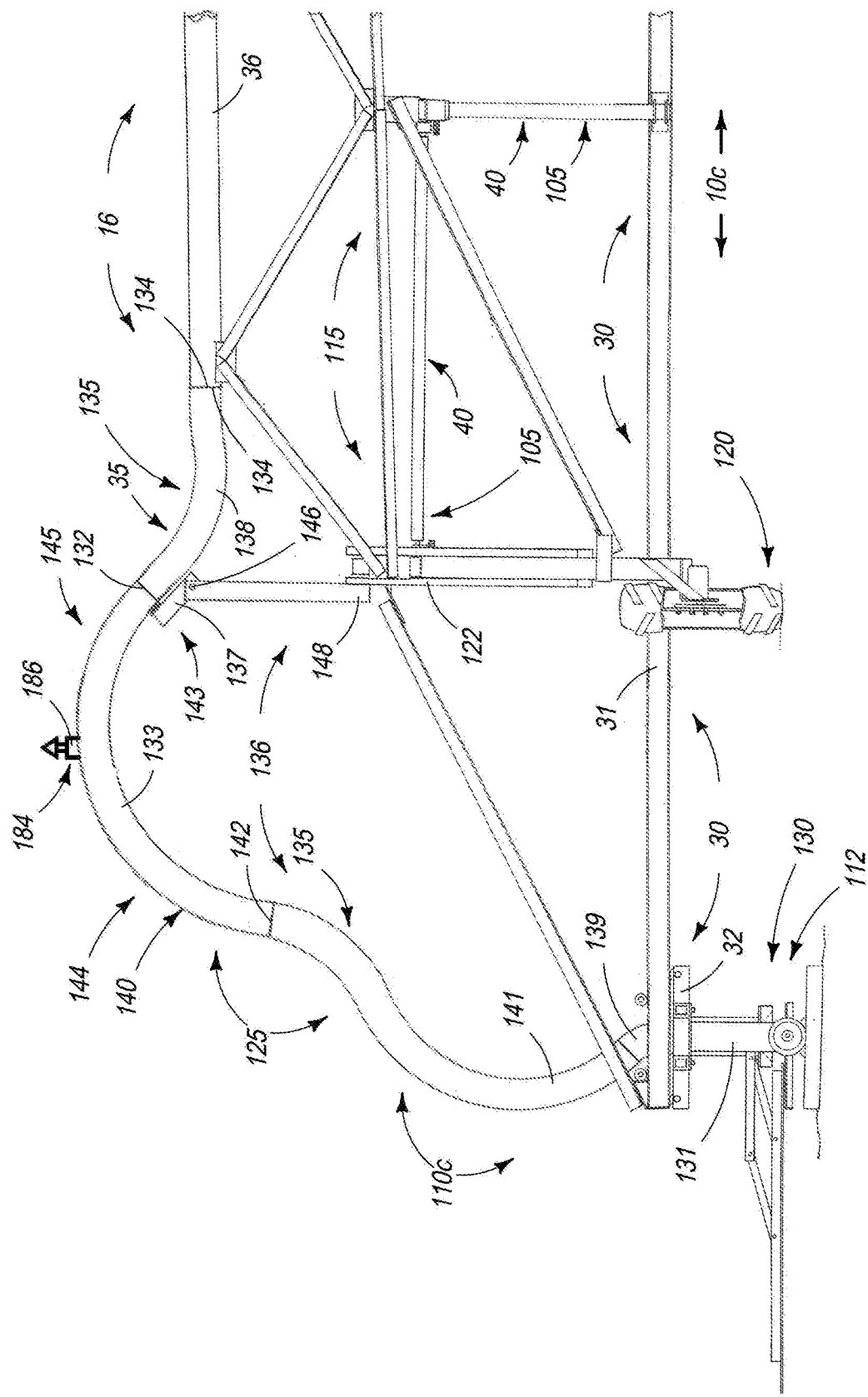
FIG. 9 is a view of the apparatus as oriented in FIG. 5 with the exception that water conveyance 125 includes a flexible conduit with pivoting conduit.
Figure 10:
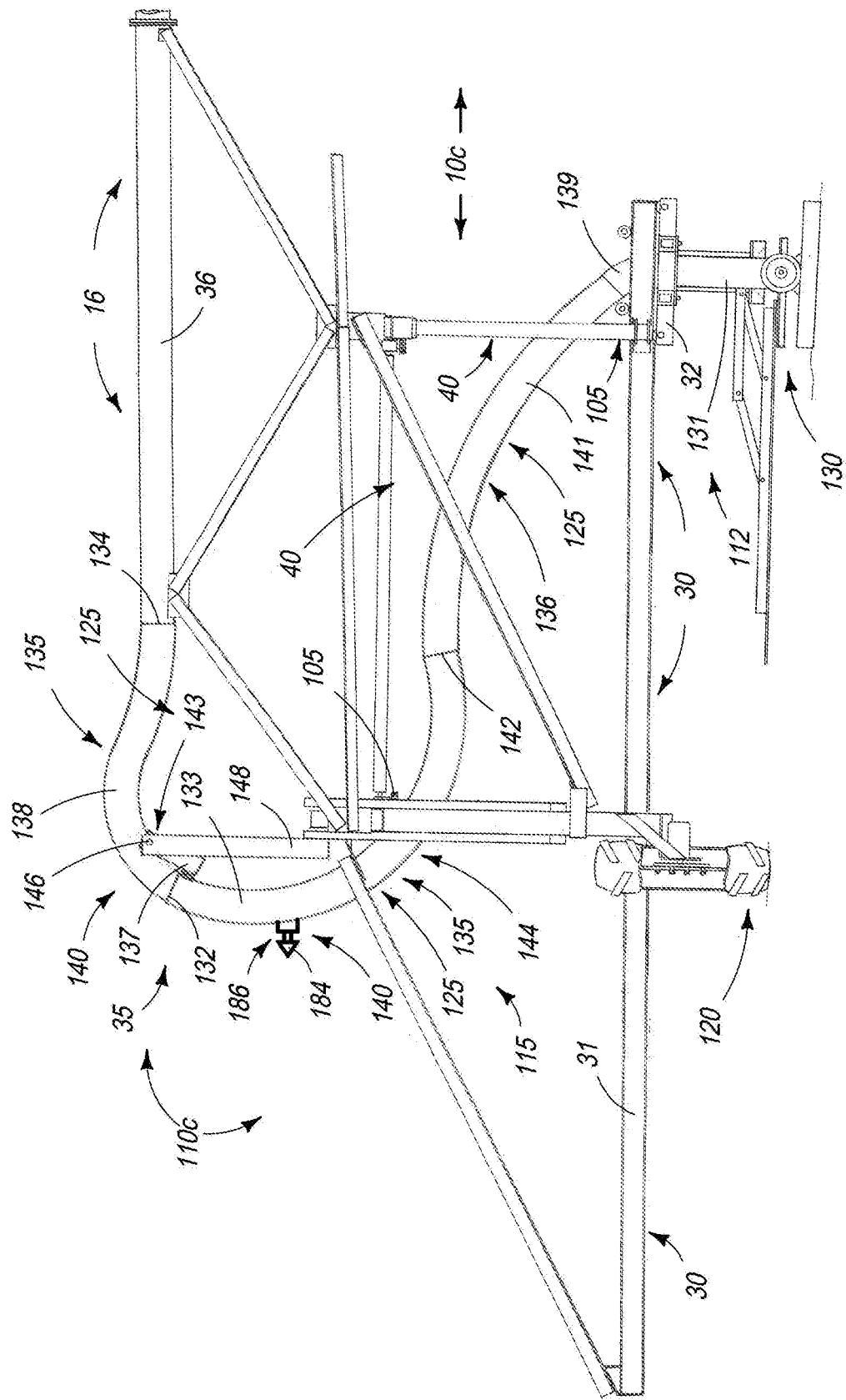
FIG. 10 is a view of the apparatus as oriented in FIG. 6 with the exception that water conveyance 125 includes a flexible conduit with pivoting conduit.

Water conveyance 125 functions to operably flow water between a valve coupler and a swing arm, the valve coupler movable to raise, lower and travel horizontally relative to the swing arm. One example of conveyance 125, a directed flexible conduit 126 is illustrated in FIGS. 5 through 7. Another example of conveyance 125, a flexible conduit with pivoting conduit 140 is illustrated in FIGS. 8 through 10. Another example of conveyance 125, a conduits with flexible conduit 170 is illustrated in FIGS. 13a through 13d, 14a through 14d and 15a through 15d. Another example of conveyance 125, a caged flexible conduit 190 is illustrated in FIG. 16. Another example of conveyance 125, a trolley supported conveyance 205 is illustrated in FIGS. 17a through 17d. (Water conveyance 125 can be any means to operably flow water between coupler body 131 and swing arm 16. For example, conveyance 125 can be the described swing pipe disclosed in U.S. Pat. No. 6,431,475, or can be some other contrivance.)

An example of operation of linear-move irrigation system 10 where system 10 comprises single coupler automated connector 112 and connector 112 comprises swing arm 16, transporter 120, valve coupler 130, swing arm length adjuster 30, pivoting ground support 100 and water conveyance 125 will now be given (illustrated in the side elevation of FIG. 18, system travel illustrated diagrammatically in FIG. 19). Delivery pipe assembly 15 is situated somewhere between ends of the field as shown. Delivery pipe assembly 15 has previously been applying water while traveling forward along water main 11 with coupler body 131 of valve coupler 130 connected to access valve 12a, said travel of assembly 15 indicated by the dashed lines parallel to main 11. During said travel, pivoting ground support 100 has been providing ground support of the swing arm outer end 35 and enabling pivoting of the swing arm outer end 35. Travel of pipe assembly 15 has caused trolley 32 to transit along rails 31 as facilitated by swing arm length regulating means 30 to an outer end of rails 31 (see FIG. 2). Detection of said outer end positioning has instructed valve coupler 130 to disconnect from valve 12a. Transporter 120 has then transported valve coupler 130 from access valve 12a to access valve 12b, said transport guided by swing arm 16 as indicated by arced line 87. Valve coupler 130 has then connected to access valve 12b. Subsequently, pipe assembly 15 now resides as shown and resumes forward travel while applying water with pivoting ground support 100 providing ground support of the swing arm outer end 35 and enabling pivoting of the swing arm outer end 35. Upon connection of body 131 to an access valve 12, water conveyance 125 provides to flow water between coupler body 131 of valve coupler 130 to swing arm 16 and ultimately to delivery pipe assembly 15 and onto the ground surface.

System 10 comprising linear-move delivery pipe assembly 15 and single coupler automated coupler 112 can be configured to irrigate in any manner as described in U.S. Pat. No. 6,431,475 (or can be configured otherwise). For example, system 10 can be configured as back and forth travel, mainline 11 with valves 12 being positioned along the edge of a field. Mainline 11 with valves 12 can be positioned down the center of a field and pipe assembly 15 is employed to irrigate along one side of mainline 11. Assembly 15 is then dry rotated to a position along the opposite side of mainline 11 where pipe assembly 15 subsequently irrigates along this side of line 11. The rotation capability, for example using an access valve as an anchor, enables pipe assembly 15 to be employed as a center-pivot irrigator, i.e. irrigating a circular area, for example in addition to being employed to linear-move irrigate.

Single coupler automated connector 112 can comprise an independent vertical coupler connector 110. Independent vertical coupler connector 110 functions to forward a coupler along a water main employing independent vertical coupler travel. Examples of an independent vertical coupler connector 110 are illustrated in FIGS. 1 through 4 and FIGS. 11 and 12. The exemplary independent vertical coupler connector 110 comprises valve coupler 130 and wherein coupler 130 comprises an independent vertical coupler travel 105.

Independent vertical coupler travel 105 functions to provide independent vertical valve coupler travel. Examples of travel 105 are illustrated in FIGS. 1 through 12. As one example, travel 105 can comprise the example of vertical coupler and rails travel 40 illustrated in FIGS. 1 through 10. As another example, travel 105 can comprise the example of vertical coupler travel 80 illustrated in FIGS. 11 and 12. The exemplary travel 40 and travel 80 provide to accomplish vertical travel of coupler body 131 independent from vertical travel of swing arm outer end 35. The exemplary travel 40 and travel 80 also provide to accomplish vertical travel of coupler body 131 independent from vertical travel of transport wheels 121. The exemplary travel 40 and travel 80 also provide to accomplish vertical travel of body 131 and ground support wheels 27 independent from vertical travel of swing arm outer end 35. The exemplary travel 40 and travel 80 also provide to accomplish vertical travel of body 131 and support wheels 27 independent from vertical travel of transport wheels 121.

A first embodiment of linear-move irrigation system 10 is illustrated in FIGS. 1 through 17d. This first embodiment comprises linear-move water delivery pipe assembly 15 and single coupler automated connector 112 and wherein connector 112 comprises independent vertical coupler connector 110. For this first embodiment, connector 110 comprises swing arm 16, transporter 120, valve coupler 130, swing arm length adjuster 30, pivoting ground support 100 and water conveyance 125 and wherein coupler 130 comprises independent vertical coupler travel 105.

A first example of this first embodiment of linear-move irrigation system 10, system 10a, is illustrated in FIGS. 1 through 4. This first example comprises independent vertical coupler connector 110a. Connector 110a comprises swing arm 16, transporter 120, valve coupler 130, swing arm length adjuster 30, pivoting ground support 100 and water conveyance 125. For this example, valve coupler 130 comprises independent vertical coupler travel 105 and coupler travel 105 comprises a vertical coupler and rails travel 40. For this first example, water conveyance 125 can be any means to operably flow water between coupler body 131 and swing arm 16. (Conveyance 125 in FIGS. 1-4 is shown employing a directed flexible conduit 126, described later.) Vertical coupler and rails travel 40 functions to provide essentially vertical travel of a valve coupler. An example of travel 40 is illustrated in FIGS. 1 through 4. The exemplary travel 40 includes four of a linear travel pipe 42, four of a linear bearing 43, two of a lead screw 41, two of a right angle gear box 44, four of a gear 45, a drive-line 46, a hydraulic motor 47, two of a top beam 48 and two of a lead screw nut 49.

As illustrated, each travel pipe 42 is attached at a bottom end to one of the two rails 31. Each travel pipe 42 is attached at a top end to top beam 48. Each travel pipe 42 is supported to prevent horizontal travel by, and slides inside of, an associated linear bearing 43. Two of the four of bearing 43 are mounted to transport frame 122 and the other two of the four of bearing 43 are mounted to swing arm 16. Each gearbox 44 drives one of the two of lead screw 41 via a set of two of the four of gear 45 as illustrated. Hydraulic motor 47 is coupled to an input shaft of one of the two of gearbox 44 as illustrated. One end of drive-line 46 is coupled to a through shaft end of the input shaft of one of the two of gear box 44, the other end of the input shaft coupled to motor 47. The other end of drive-line 46 is coupled to an input shaft of the other of the two of gear box 44 as illustrated. Each one of the two of lead screw nut 49 is secured to the associated one of the two of top beam 48 and travels along the respective lead screw 41 when the lead screw 41 is turned. The bottom end of one of the two of lead screw 41 is bearing mounted to transport frame 122 as illustrated. The bottom end of the other one of the two of lead screw 41 is bearing mounted to swing arm 16 as illustrated.

An example of operation of vertical coupler and rails travel 40 will now be given. Hydraulic motor 47 is powered to turn in the appropriate direction to result in the lowering of coupler body 131. Turning motor 47 turns the coupled-to input shaft of the one of the two of gearbox 44. The through shaft end of the turning input shaft turns drive-line 46. Drive-line 46 thus turns the input shaft of the other one of the two of gearbox 44. The resultant turning input shaft of each of gearbox 44 turns the associated output shaft of each of box 44 thus turning the associated set of two of gear 45. Each turning set of two of gear 45 turns the associated attached lead screw 41. Each turning screw 41 turns inside the associated nut 49 causing each nut 49 to travel lower meaning each associated beam 48 lowers. The lowering of each beam 48 effects to force the attached travel pipes 42 lower and, thus, effects to lower the attached two rails 31. The lowering of each rail 31 effects to lower trolley 32 movably mounted thereon meaning coupler body 131 is lowered as well. The lowering of coupler body 131 thus enables body 131 to mate with and couple to an access valve 12. (Springs 62 of valve coupler 130 maintain body 131 centered between the two trolley assemblies 33 prior to contact with valve 12 thus reserving sufficient travel of horizontal travel of tubes 61 (relative to assemblies 33) to enable alignment with the valve 12 along the axis perpendicular to rails 31. Assemblies 33 are allowed to free float along rails 31 to enable alignment with valve 12 along the axis parallel to rails 31.) The further lowering of each rail 31 and thus body 131 results in each ground support wheel 27 of pivotal ground support 100 contacting pivot pad 101. Said contact with pad 101 halts downward travel of body 131 (and rails 31) and the further simultaneous travel of each rail 31 affects to instead raise swing arm outer end 35 and thus to raise transport wheels 121 off of contact with the ground.

A second example of this first embodiment, system 10b, is illustrated in FIGS. 5 through 7. This second example comprises linear-move water delivery pipe assembly 15 and single coupler automated connector 112 and wherein connector 112 comprises independent vertical coupler connector 110b. Connector 110b comprises swing arm 16, transporter 120, valve coupler 130, swing arm length adjuster 30, pivoting ground support 100 and water conveyance 125. Water conveyance 125 comprises a directed flexible conduit 126. For this second example, coupler 130 is described comprising independent vertical coupler travel 105 with coupler travel 105 comprising vertical coupler and rails travel 40. However, for this second example, coupler 130 can comprise other than travel 105 and travel 105 can comprise other than travel 40. As one example, travel 105 can comprise a vertical coupler travel 80 described later on.

Directed flexible conduit 126 functions to operably flow water between a coupler and a swing arm, the coupler movable relative to the swing arm. An example of directed flexible conduit 126 is illustrated in FIGS. 5 through 7. The exemplary conduit 126 includes a hose 124, a top pipe union 129 and a coupler body union 119 and can include a horizontal support 127 and can include a bending radius support 128.

Hose 124 comprises a flexible hose capable of carrying water. Hose 124 can comprise a reinforced hose 123. Reinforced hose 123 can comprise a suction hose and/or can comprise a helical reinforcement to prevent the forming of one or more kinks when the hose is bent.

Top pipe union 129 comprises a coupling of a hose to a pipe. Union 129 can comprise a king nipple and a clamp. Union 129 comprises a near 90-degree elbow attached to the essentially horizontal swing arm supply pipe 36 thus union 129 affects to groundwardly face the connection to hose 124. (Union 129 can be other than a 90-degree elbow.) The downward facing union 129 provides that hose 124 and water weight from the directional swings of hose 124 are symmetrically loaded onto hose 124 to reduce wear on hose 124 and to help prevent hose 124 from developing a kink. Top pipe union 129 is horizontally located near half way along the length of rails 31 providing to minimize the length of hose 124 and, thus, to substantially minimize kink and to substantially maximize ground clearance of hose 124

Coupler body union 119 comprises a coupling of a hose to a pipe. Union 119 can comprise a king nipple and a clamp. Union 119 comprises a 90-degree elbow. (Union 119 can be other than a 90-degree elbow.) The inward facing (facing towards pipe assembly 15) and horizontally facing elbow positions the thereto coupled hose 124 to accommodate the varying positions of hose 124 resultant from coupler body 131 travel from the travel of swing arm length adjuster 30 and coupler body 131 travel from the travel of vertical coupler and rails travel 40.

Horizontal support 127 comprises a one-third pipe-section attached to trolley 32 (can comprise other). The pipe section provides elevation support of hose 124 thus increasing ground clearance for hose 124.

Bending radius support 128 comprises a longitudinally rolled one-third pipe section attached to trolley 32 (can comprise other). The pipe section provides radial support to hose 124 to reduce wear to hose 124 when bent downward.

An example of operation of this second example of this first embodiment will now be given. Connector 110b can operate as described for the example of operation of the first example of this first embodiment (FIGS. 1 through 4). Said operation results in the positioning extremes of the trolley 32 (and thus coupler body 131) along rails 11 illustrated in FIGS. 2 and 4 through 6. Said positioning extremes present generally corresponding force extremes subjected to directed flexible conduit 126. FIG. 2 illustrates movable coupler body 131 positioned for coupling to an access valve 12 and, thus, the corresponding positioning of conduit 126. FIG. 4 illustrates movable coupler body 131 coupled to an access valve 12 and, thus, the corresponding positioning of directed flexible conduit 126. FIG. 5 illustrates movable coupler body 131 positioned at the outward end of rails 31 and, thus, the corresponding positioning of directed flexible conduit 126. FIG. 6 illustrates movable coupler body 131 positioned at the inward end of rails 31 and, thus, the corresponding positioning of conduit 126.

Embodiments of single coupler automated connector 112, including embodiments employing directed flexible conduit 126, can employ a hose brace 85. Brace 85 functions to maintain vertical position during bending. An example of hose brace 85 is illustrated in FIG. 6. The exemplary brace 85 provides to maintain hose 123 residing substantially in a vertical plane, in this example, above coupler body 131. In other words, the exemplary brace keeps hose 123 from flopping to one side or the other when bent (rolled) upward. Brace 85 is attached at one end to union 119 and at the other end to hose 123. Brace 85 comprises a union half 83, a hose half 84 and a brace joint 86. Union half 83 is welded to union 119. Hose half 84 is attached to hose 123. Joint 86 is a hinge mounted between half 83 and half 84. Joint 86 allows rotation in a substantially vertical plane and maintains rigidity from movement outside of said vertical plane.

FIG. 7 is a view similar to that of the apparatus illustrated in FIG. 4 showing water conveyance 125 comprising directed flexible conduit 126 where conduit 126 is configured without horizontal support 127. FIG. 7 serves to illustrate the reduction in ground clearance without support 127.

A third example of this first embodiment, system 10c, is illustrated in FIGS. 8 through 10. This third example comprises linear-move water delivery pipe assembly 15 and single coupler automated connector 112 and wherein connector 112 comprises independent vertical coupler connector 110c. Connector 110c comprises swing arm 16, transporter 120, valve coupler 130, swing arm length adjuster 30, pivoting ground support 100 and water conveyance 125. Water conveyance 125 comprises a flexible conduit with pivoting conduit 140. For this third example, valve coupler 130 comprises independent vertical coupler travel 105 with coupler travel 105 comprising vertical coupler and rails travel 40. However, for this third example, coupler 130 can comprise other than travel 105 and travel 105 can comprise other than travel 40. For example, travel 105 can comprise a vertical coupler travel 80 described later on.

Flexible conduit with pivoting conduit 140 functions to operably flow water between a coupler and a swing arm, the coupler movable relative to the swing arm. One example of flexible conduit with pivoting conduit 140 is illustrated in FIGS. 8 through 10 (also illustrated in FIGS. 11 and 12). The exemplary flexible conduit with pivoting conduit 140 includes at least one flexible conduit 135 and at least one pivoting conduit 145. Flexible conduit with pivoting conduit 140 can include an air vent 184.

Figure 11:
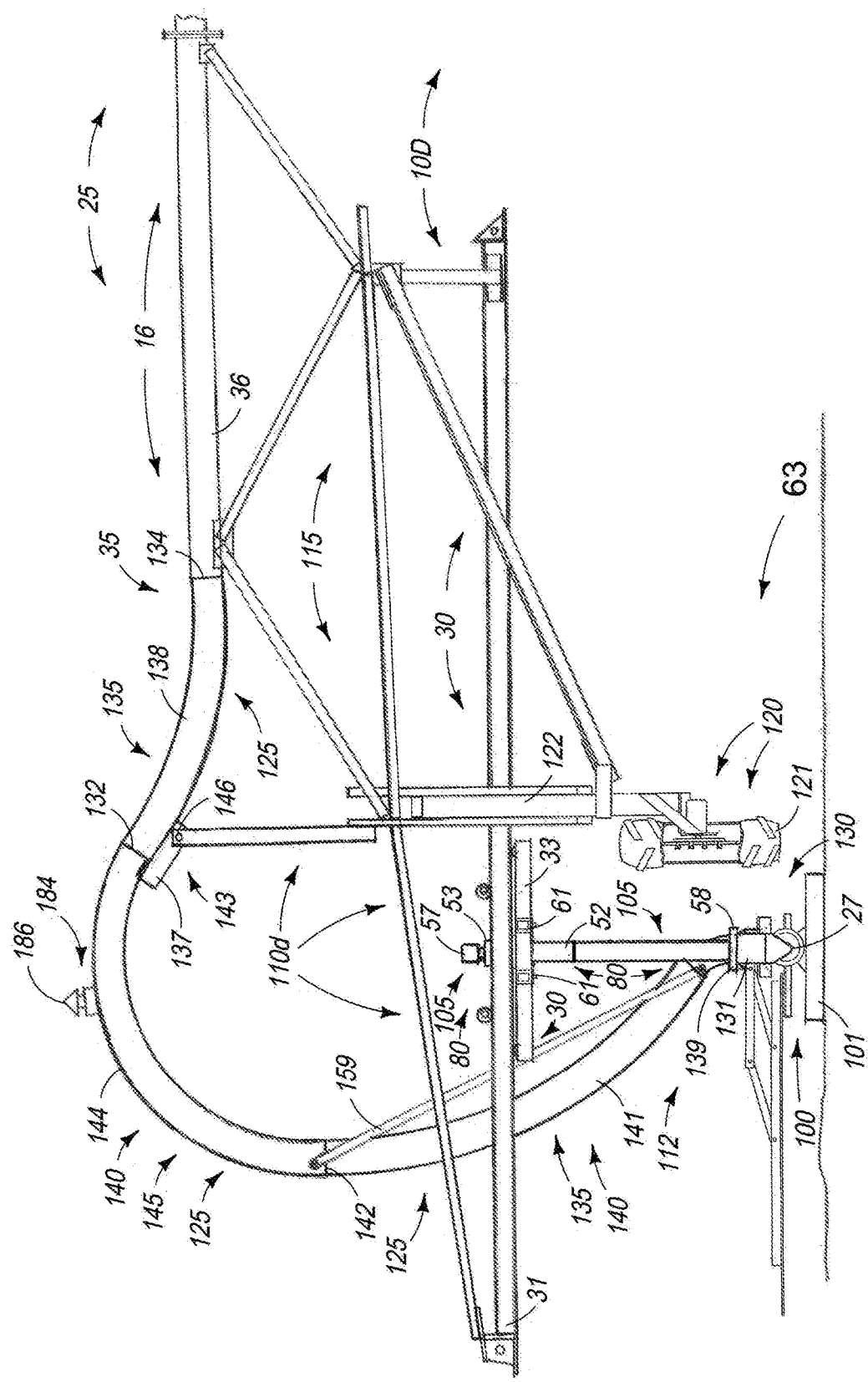
FIG. 11 is a side elevation view of an outer end of a swing arm of an automated connector of the present invention sporting a transporter, a valve coupler, a swing arm length adjuster and a water conveyance and wherein the valve coupler includes a vertical coupler travel.
Figure 12:
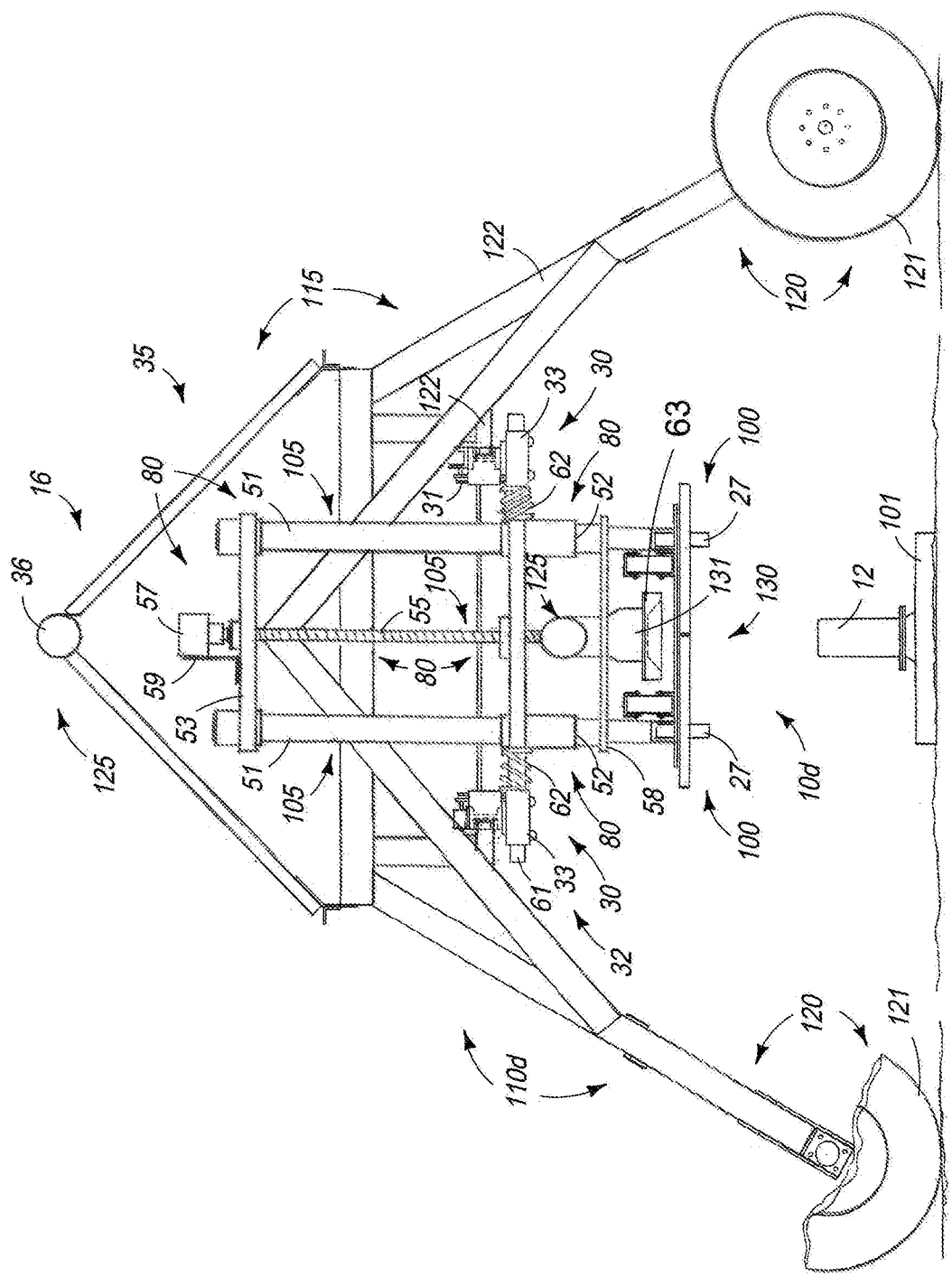
FIG. 12 is an end elevation view of the apparatus illustrated in FIG. 11.

One example of flexible conduit 135 is illustrated in FIGS. 8 through 10 (also illustrated in FIGS. 11 and 12). The exemplary flexible conduit 135 comprises a top hose 138 and a bottom hose 141.

Top hose 138 comprises a bendable hose capable of carrying water. Hose 141 can comprise the prior described reinforced hose 123 or can be some other hose. Top hose 138 can comprise swing arm pipe union 134 and can comprise rolled pipe upper union 132. Swing arm pipe union 134 comprises a coupling of a hose to a pipe. Union 134 can comprise a king nipple and a clamp. Said nipple can be welded to the end of swing arm supply pipe 36. The outward-facing union 134 (nipple, facing away from pipe assembly 15) provides to orient top hose 138 to accommodate essentially all orientations from the pivoting of rolled pipe 133 (pipe 133 of pivoting conduit 145 described below). Rolled pipe upper union 132 comprises a coupling of a hose to a pipe. Union 132 can comprise a king nipple and a clamp. Said nipple can be welded to an upper end of rolled pipe 133 (of pivoting conduit 145 described below). Said nipple can be essentially linearly aligned with the direction of the longitudinal axis of pipe 133 at the welded-to end of pipe 133 to thus substantially increase flow efficiency.

Bottom hose 141 comprises a bendable hose capable of carrying water. Hose 141 can comprise the prior described reinforced hose 123 or can be some other hose. Bottom hose 141 can comprise rolled pipe lower union 142 and can comprise coupler body union 139. Rolled pipe lower union 142 comprises a coupling of a hose to a pipe. Union 142 can comprise a king nipple and a clamp. Said nipple can be welded to a lower end of rolled pipe 133 (pipe 133 of pivoting conduit 145 described below). Said nipple can be essentially linearly aligned with the direction of the longitudinal axis of rolled pipe 133 at the welded-to end of rolled pipe 133 to thus substantially increase flow efficiency. Coupler body union 139 comprises a coupling of a hose to a pipe. Coupler body union 139 can comprise a king nipple and a clamp. Union 139 can comprise a 45-degree elbow as illustrated. The outward (away from pipe assembly 15) and upward facing elbow provides to orient bottom hose 141 generally upward and outward to accommodate essentially all movement of coupler body 131 in combination with accommodating all orientations from the pivoting of rolled pipe 133, said pivoting resultant from said movement of coupler body 131.

Pivoting conduit 145 functions to pivotably enable water flow. An example of pivoting conduit 145 is illustrated in FIGS. 8 through 10 (also illustrated in FIGS. 11 and 12). The exemplary pivoting conduit 145 comprises a length of conduit 144 and a pivoting mount 143.

Length of conduit 144 comprises a conduit capable of water flow. An example of length of conduit 144 is illustrated in FIGS. 8 through 10. The exemplary length of conduit 144 comprises a rolled pipe 133. Pipe 133 can be a light gauge aluminum round tube (or light gauge steel tube/pipe) machine shop rolled into a segment of the circumference of a circle, for example a circumference have a ten foot diameter. The segment can be, for example, 120 degrees of the 360 degrees in a circle. (As another example, length of conduit 144 can be a straight length of round tube/pipe capable of water flow.)

Pivoting mount 143 comprises a pivot for pivoting length of conduit 144. An example of pivoting mount 143 is illustrated in FIGS. 8 through 10. The exemplary pivoting mount 143 comprises an axle with bearing 146, a mount 147, a strut 148 and a support 137. Strut 148 is welded at a bottom end to transport frame 122. Axle with bearing 146 is mounted at a top end of strut 148. The axle component of axle with bearing 146 is welded to support 137. Support 137 is welded to an upper end of rolled pipe 133. The bearing enables the axle to rotate thus allowing support 137, and thus rolled pipe 133, to rotate in a substantially vertical plane. (The vertical plane is substantially longitudinally aligned with the longitudinal axis of swing arm supply pipe 36.)

An example of operation of this third example of this first embodiment will now be given. Connector 110c can operate as described for the example of operation of the first example of this first embodiment. Said operation results in the positioning extremes of the trolley 32 (and thus coupler body 131) along rails 31 illustrated in FIGS. 8 through 10. Said positioning extremes present the essentially corresponding force extremes subjected to flexible conduit with pivoting conduit 140. FIG. 8 illustrates movable coupler body 131 positioned for coupling to an access valve 12 and, thus, the corresponding positioning of flexible conduit with pivoting conduit 140. FIG. 9 illustrates coupler body 131 coupled to an access valve 12 and positioned at the outward end of rails 31 and, thus, the corresponding positioning of flexible conduit with pivoting conduit 140. FIG. 10 illustrates coupler body 131 coupled to an access valve 12 and positioned at the inward end of rails 31 and, thus, the corresponding positioning of flexible conduit with pivoting conduit 140.

The exemplary flexible conduit with pivoting conduit 140 can include a pivotable link 159 illustrated in FIG. 1. Link 159 is shown mounted to extend between rolled pipe lower union 142 and coupler body union 139. One end of the link 159 is pivotably mounted to lower union 142 and at the other end of the link 159 is pivotably mounted to body union 139. Wherever trolley 32 is positioned along rails 31 and when trolley 32 translates along rails 31, link 159 serves to provide support for bottom hose 141.

Pivoting conduit 140 can comprise air vent 184. Air vent 184 comprises contrivance to allow air to enter and/or to allow air to exit. An exemplary air vent 184 is illustrated in FIGS. 8 through 11. Exemplary air vent 184 comprises a mechanical vent 186. Vent 186 can be the same or similar to mechanical drain vents employed on conventional irrigation equipment or can be other. Vent 186 can be coupled to a top side of rolled pipe 133 as shown. Vent 186 allows air to enter pipe 133 when coupler body 131 is not coupled to an access valve 12. Vent 186 provides to close and thus not allow air to enter pipe 133 or water to escape from pipe 133 when body 131 is coupled to a valve 12 and, thus, when water pressure exists in pipe 133. By enabling air to enter conveyance 125, vent 186 can provide for the water located in conveyance 125 to drain out of body 131, for example, to lighten conveyance 125 during transport between access valves 12. (All embodiments herein disclosed of conveyance 125 as well as other embodiments of conveyance 125 can also comprise and at least one of air vent 184).

A fourth example of this first embodiment of linear-move irrigation system 10, system 10d, is illustrated in FIGS. 11 and 12. This fourth example comprises independent vertical coupler connector 110d. Connector 110d comprises swing arm 16, transporter 120, valve coupler 130, swing arm length adjuster 30, pivoting ground support 100 and water conveyance 125. For this fourth example, valve coupler 130 comprises independent vertical coupler travel 105 and coupler travel 105 comprises a vertical coupler travel 80. For this fourth example, water conveyance 125 can comprise any means to operably flow water between coupler body 131 and swing arm 16. (Conveyance 125 is shown employing flexible conduit with pivoting conduit 140. Conveyance 125 can be directed flexible conduit 126 or can be or comprise the described swing pipe disclosed in U.S. Pat. No. 6,431,475, or can be some other contrivance.)

Vertical coupler travel 80 functions to provide essentially vertical travel of a valve coupler. An example of vertical coupler travel 80 is illustrated in FIGS. 11 and 12. The exemplary travel 80 includes two of a stabilizer pipe 51, two of a nylon linear bearing 52, a top beam 53, a bearing block 54, a lead screw 55, a screw nut 56 and a hydraulic motor 57, a horizontal support 58 and a motor mount 59.

Each stabilizer pipe 51 extends substantially vertically and is affixed at a bottom end to one of the two ends of horizontal support 58. Coupler body 131 is affixed to support 58 substantially in the center of support 58 (between said two ends). Each linear bearing 52 is fitted inside a pipe with said pipe affixed to the two horizontal tubes 61, said pipe substantially centered between the two tubes 61 (tubes 61 of coupler 32), each linear bearing 52 positioned between lead screw 55 and the springs 62 adjacent to one of the roller assemblies 31. Each bearing 52 provides support and thus stability to the respective stabilizer pipe 51. Each end of top beam 53 is secured to the top end of the respective stabilizer pipe 51. Bearing block 54 is mounted at the center of the length of top beam 54. A top end of lead screw 55 is affixed to bearing block 54 enabling screw 55 to rotate while restricting screw 55 from vertical travel. Screw nut 56 is affixed to the two horizontal tubes 61 substantially centered between the two tubes 61. Rotation of screw 55 causes nut 56 to travel/run along screw 55. Motor mount 59 is affixed to top beam 53 with hydraulic motor 57 bolted to mount 59 such that motor 59 substantially resides at the center of the length of beam 53. Hydraulic motor 57 is coupled to the top end of lead screw 55 such that operation of motor 57 rotates screw 55. (In contrast to the example of vertical coupler and rails travel 40, the exemplary coupler travel 80 is not configured to cause rails 31 of length adjuster 30 to travel vertically along with coupler body 31. Instead, rails 31 are fixed in position. Each rail 16 is attached near one end to swing arm 16 and attached toward the other end to transport leg frame 122 as shown in FIGS. 11 and 12.)

An example of operation of vertical coupler travel 80 will now be given. Hydraulic motor 57 is powered to turn in the appropriate direction to result in the lowering of coupler body 131. Turning motor 57 turns the coupled-to lead screw 55. The turning screw 55 turns inside screw nut 56 forcing top beam 53 to travel toward horizontal tubes 61 and, thus, to travel downward meaning stabilizer pipes 51 are also forced to travel downward. Each stabilizer pipe 51 travels downward guided by the respective linear bearing 52. Downward travel of stabilizer pipes 51 correlates to downward travel of body 131 (body 131 being attached to pipes 51 via support 58). Downward body 131 enables mating with and coupling to an access valve 12. (Springs 62 of valve coupler 130 maintain body 131 centered between the two trolley assemblies 33 prior to contact with valve 12 thus reserving sufficient horizontal travel of tubes 61 relative to assemblies 33 to enable alignment with the valve 12 along the axis essentially perpendicular to rails 31. Assemblies 33 are allowed to free float along rails 31 to enable alignment with valve 12 essentially along the axis parallel to rails 31.) Further downward travel subsequently results in wheels 27 of support 100 contacting pad 101 (FIG. 11). Said contact causes a halt to the downward travel of body 131 and, instead, upward travel of swing arm outer end 35 correlating to upward travel of transport wheels 121 subsequently raising wheels 121 off of the ground. (Powering motor 57 to turn in the direction opposite the above-said appropriate direction results in the raising of coupler body 131.)

A fifth example of this first embodiment, system 10e, is illustrated in FIGS. 13a through 13d, 14a through 14d and 15a through 15d. This fifth example comprises linear-move water delivery pipe assembly 15 and single coupler automated connector 112 and wherein connector 112 comprises independent vertical coupler connector 110e. Connector 110e comprises swing arm 16, transporter 120, valve coupler 130, swing arm length adjuster 30, pivoting ground support 100 and water conveyance 125. For this fifth example, valve coupler 130 comprises independent vertical coupler travel 105 and coupler travel 105 comprises vertical coupler travel 80 (coupler travel 80 described in the above fourth example). (FIG. 30 of U.S. Pat. No. 9,301,459 can be referenced as a generally accurate end view of FIGS. 13a through 13d, 14a through 14d and 15a through 15d, though conveyance 125 of this application is not there-represented.)

For this fifth example, water conveyance 125 comprises a conduits with flexible conduit 170. Conduits with flexible conduit 170 functions to operably flow water between a coupler and a swing arm, the coupler movable relative to the swing arm. Examples of conduit 170 are illustrated in FIGS. 13a through 13d, 14a through 14d and 15a through 15d.

Conduits with flexible conduit 170 comprises at least two of a rigid conduit 171 and at least one of a flexible conduit 172. Conduits with flexible conduit 170 can comprise at least one of a flow router 174 and can comprise at least one of a conduit hanger 185. (Water conveyance 125 of the above-described third example of this first embodiment, as well as other embodiments of system 10, for example embodiments comprising independent vertical coupler connector 110, can comprise conduits with flexible conduit 170.)

Rigid conduit 171 comprises a substantially rigid length of conduit capable of carrying water flow. Rigid conduit 171 can comprise a straight conduit 175. Examples of straight conduit 175 are illustrated in FIGS. 13a through 15d and 17a through 17d. Straight conduit 175 can be a substantially straight length of light gauge aluminum round tube (or light gauge steel tube/pipe or composite tube/pipe such as pvc or abs or can be other).

Rigid conduit 171 can comprise a curved conduit 180. One example of curved conduit 180, curved conduit 180a, is illustrated in FIGS. 14a through 14d. Another example of curved conduit 180, curved conduit 180b, is illustrated in FIGS. 17a through 17d. Curved conduit 180 can be a length of light gauge aluminum round tube that has been, for example, rolled along one axis via a tube rolling machine resulting in the tube being curved (along one axis). Curved conduit 180 can be a length of light gauge aluminum round tube that has been, for example, formed into an elbow. Curved conduit 180 can be a length of light gauge aluminum round tube that has, for example, an elbow welded to one end. (Curved conduit 180 can be light gauge steel tube/pipe or composite tube/pipe such as pvc or abs or can be other. More than one curved conduit 180 can be employed in a conveyance 125.)

Flexible conduit 172 comprises a flexible conduit capable of carrying water flow and capable of being bent during water flow. Examples of flexible conduit 172 are illustrated in FIGS. 13a through 13d, 14a through 14d, 15a through 15d, 16 and 17a through 17d. The examples of flexible conduit 172 illustrated comprise a bendable hose 182. Bendable hose 182 can be any hose capable of carrying water flow and of withstanding routine bending (any hose constructed from any suitable material). Bendable hose 182 can comprise a suction hose. Bendable hose 182 can comprise a helical reinforcement to prevent the forming of one or more kinks when the hose is bent. (Bendable hose 182 can exhibit a minimum bending radius and bending the hose in a radius smaller than that minimum bending radius can cause the hose to kink which inhibits/retards water flow when flowing and can cause wear/damage to the hose over time.)

Flexible conduit 172 also comprises any hardware necessary for hydraulic connection/coupling of each of the two ends of conduit 172. As one example, connection/coupling of conduit 172 can be configured such that each end of conduit 172 is simply slid over a respective end of a tube/pipe and there-held in place to that respective end of tube/pipe via a hose clamp. For this example, flexible conduit 172 would thus include the two hose clamps. As another example, connection/coupling of conduit 172 can be configured such that each end of conduit 172 is slid over a king nipple welded to a respective end of a tube/pipe, the conduit 172 there-held in place to that respective king nipple via a hose clamp. For this example, flexible conduit 172 would thus include the two king nipples and the two hose clamps.

A first example of conduits with flexible conduit 170, conduits with flexible conduit 170a, is illustrated in FIGS. 13a through 13d. The exemplary conduits with flexible conduit 170*a* is configured to reside mostly on a side of the valve coupler 130 away from the delivery pipe 15 (as shown). The exemplary conduits with flexible conduit 170*a* comprises two of rigid conduit 171, straight conduit 175*a* and straight conduit 175*b*. The exemplary conduits with flexible conduit 170*a* comprises three of flexible conduit 172, two of a bendable hose 182*a* and one of a bendable hose 182*b*. Conduits with flexible conduit 170*a* also comprises a flow router 174.

The exemplary straight conduit 175*a* is an 8-inch outside diameter aluminum round tube roughly 65 inches long. The exemplary straight conduit 175*b* is an 8-inch outside diameter aluminum round tube roughly 40 inches long.

Each of the two exemplary bendable hose 182*a* are an 8-inch inside diameter rubber hose having a helical reinforcement to prevent kinking during bending. Hose 182*a* exhibits a minimum bending radius of 15 inches and is roughly 38 inches in length.

Figure 13A:
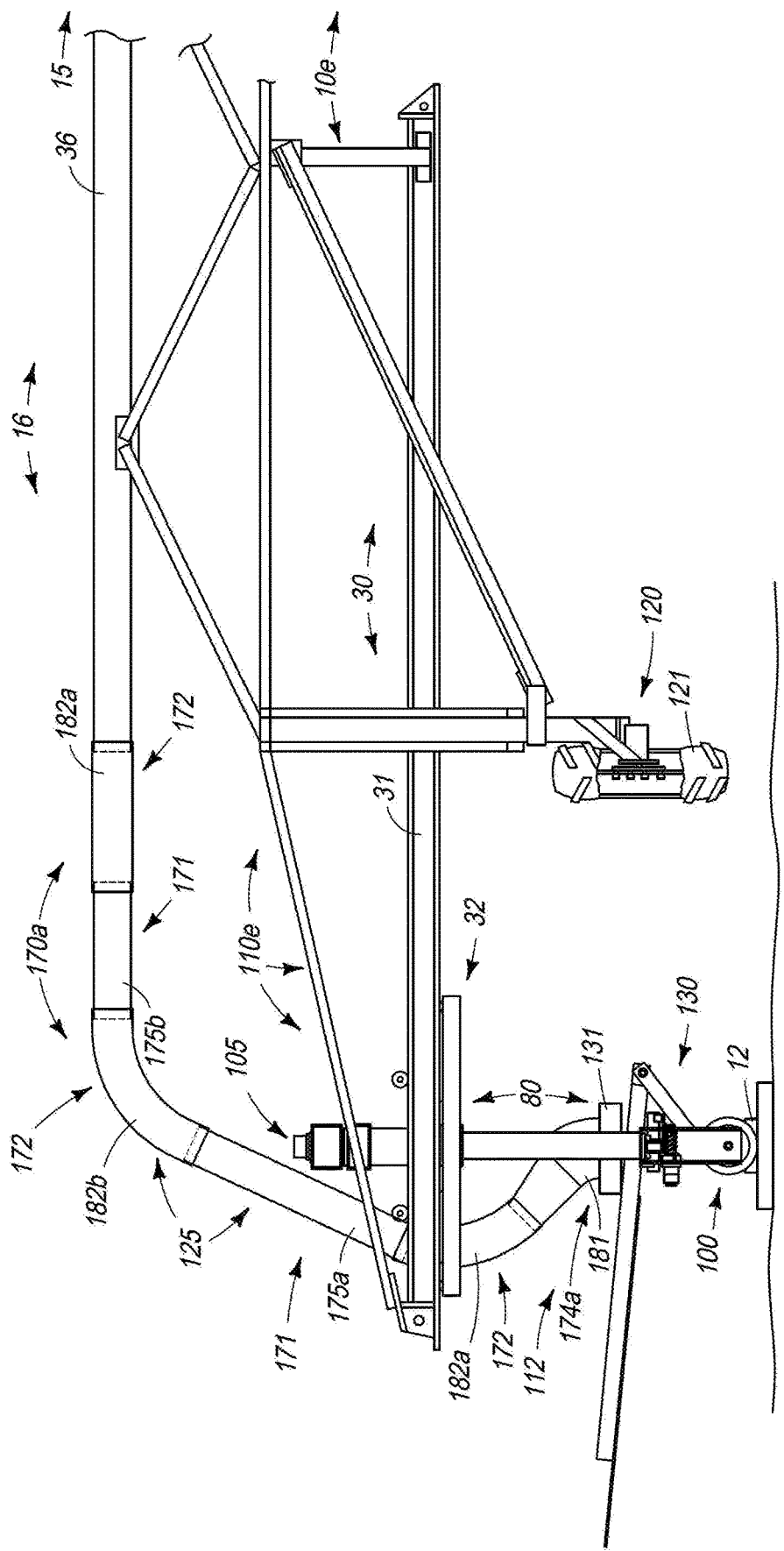
FIGS. 13a through 13d are side elevation views of the apparatus illustrated in FIG. 1 with the exception that the water conveyance 125 includes a conduits with flexible conduit and the conduits with flexible conduit is oriented mostly on a side of the coupler body away from the water delivery pipe.
Figure 13B:
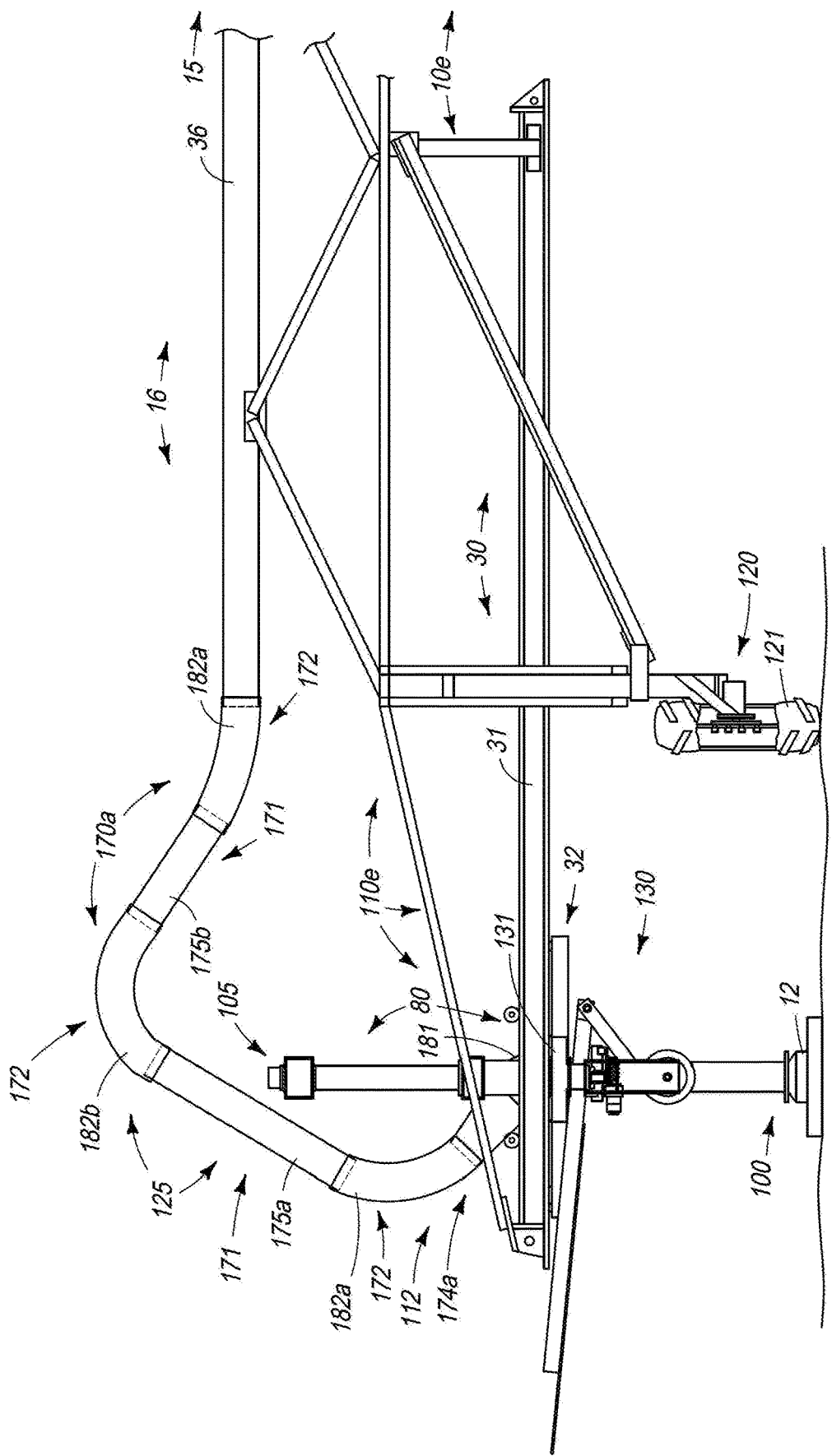
Figure 13C:
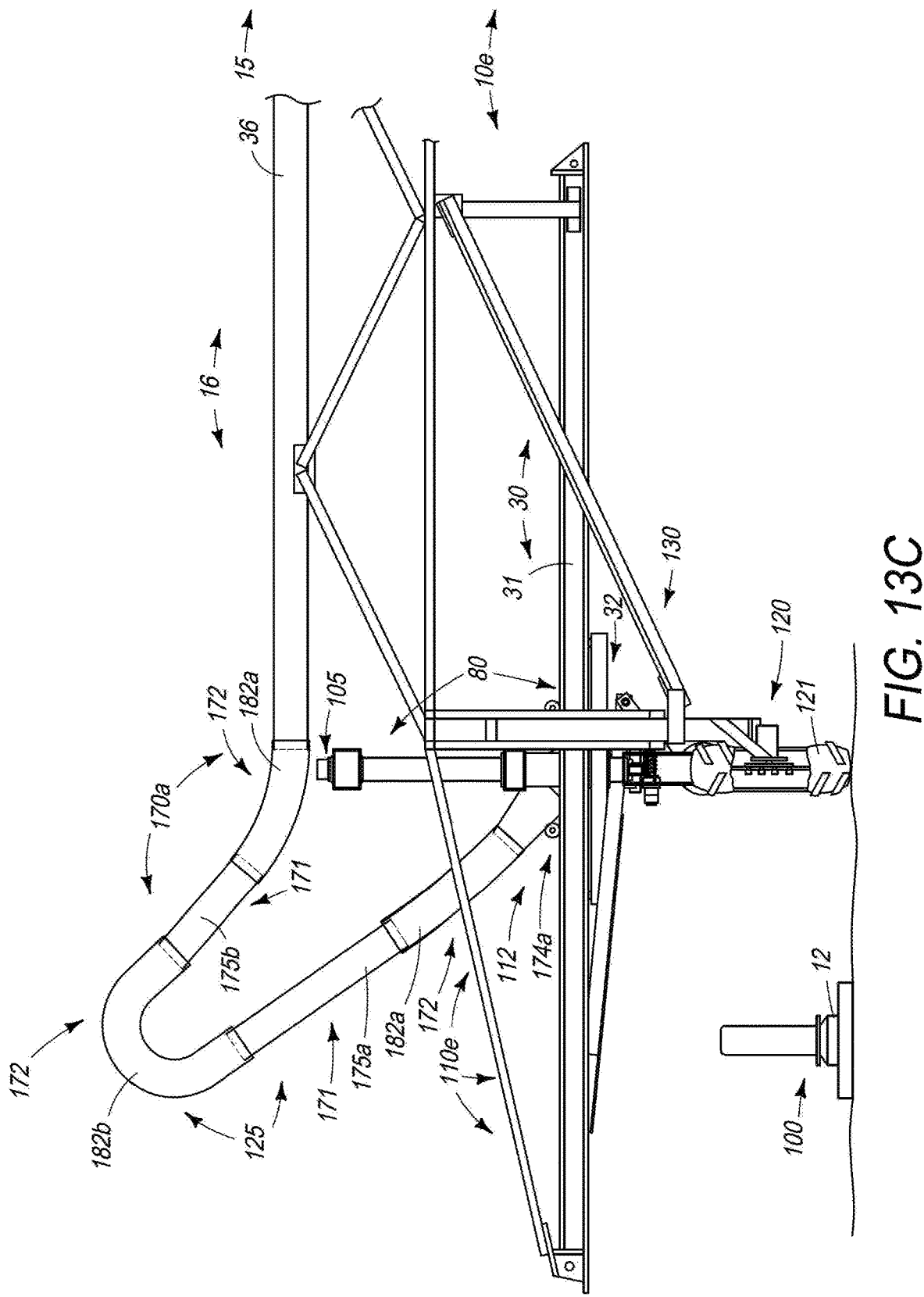

Exemplary bendable hose 182*b* is as described above for hose 182*a* (an 8-inch inside diameter rubber hose having a helical reinforcement to prevent kinking during bending with a minimum bending radius of 15 inches) except that hose 182*b* is longer, roughly 44 inches in length, to accommodate the bending exhibited in FIG. 13*c*.

Conduits with flexible conduit 170 can comprise flow router 174. Flow router 174 comprises hardware (and can comprise software) to reroute water flow direction. Flow router 174 can be any means to alter water flow direction. For example, flow router 174 can be an elbow having a long bend radius, the long bend desirable for minimizing pressure loss generated by the resultant change to the direction of the water flow. As another example, flow router 174 can be a simple metal box with a inlet pipe fabricated to one side of the box thus to flow water into the box and an outlet pipe fabricated to a selected another side of the box. Thus the inlet water is routed by the box to alter the direction of flow 90 degrees to that of the direction of the outlet pipe (provided inlet and outlet are located other than on opposite sides of the box). (An offset hinge 177, described later on, can be employed in place of flow router 174, the offset hinge 177 placed between a given conduit 171 and an attached-to member, for example swing arm pipe 36, to accommodate bending of the associated flexible conduit 172 beyond 90 degrees.)

This first example, conduits with flexible conduit 170*a*, comprises one example of flow router 174, flow router 174*a* (FIGS. 13*a* through 13*d*). The exemplary router 174*a* provides to reroute upward water flow through coupler body 131 to a direction substantially away from delivery pipe 15. The exemplary router 174*a* comprises an elbow 181. Elbow 181 is a 10-inch outside diameter 45-degree elbow and is welded atop coupler body 131 and oriented where the other end (upper end) of elbow 181 has been faced substantially away from delivery pipe 15 (thus toward mainline 1). One end of a first one of the two of bendable hose 182*a* is attached to elbow 181. (Attached via a reducer cone welded to elbow 181 to reduce the outside diameter to 8 inch, a king nipple welded to the reducer cone and a hose clamp). The other end of the first bendable hose 182*a* is attached to straight conduit 175*a* (via a king nipple welded to the end of conduit 175*a* and a hose clamp). (Embodiments of conveyance 125 can be attached directly to coupler body 131, thus for those embodiments no flow router 174 is employed.)

For this first example, conduits with flexible conduit 170*a*, one end of the second of the two of bendable hose 182*a* is attached to swing arm supply pipe 36 of swing arm 16 (attached via a king nipple welded to supply pipe 36 and hose clamp). The other end of the second bendable hose 182*a* is attached to straight conduit 175*b* (via king nipple welded to the end of conduit 175*b* and clamp). Bendable hose 182*b* is attached to the other end of straight conduit 175*b* (via a king nipple welded to that end of conduit 175*b* and clamp). The other end of the bendable hose 182*b* is attached to the end of straight conduit 175*a* opposite the conduit end attached to coupler body 131 (via king nipple and clamp).

FIGS. 13*a*, 13*b*, 13*c* and 13*d* illustrate conduits with flexible conduit 170*a* (of this fifth example of this first embodiment of system 10, system 10*e*) oriented in respective positioning extremes.

FIG. 13*a* illustrates this first example, conduits with flexible conduit 170*a*, where coupler body 31 is positioned outermost along swing arm length adjuster 30. This positioning extreme is reached when irrigation travel of delivery pipe 15 has caused travel of trolley 32 (and thus coupler body 131) along rails 31 of swing arm length regulator 30 to this the outer end of regulator 30 where disconnection from the respective access valve 12 is to commence. (FIG. 13*a* also approximates the positioning of trolley 32 and thus coupler body 131 along regulator 30 where coupling to an access valve 12 occurs and irrigation travel then commences.) FIG. 13*b* illustrates the positioning extreme for this first example, conduits with flexible conduit 170*a*, where with trolley 32 having reached the outer end of regulator 30, coupler body 131 has been disconnected from (lifted off of) the access valve 12 as necessary for subsequent transport to a next access valve 12.

FIG. 13*c* illustrates the positioning extreme for this first example, conduits with flexible conduit 170*a*, where coupler body 131 has been disconnected from (lifted off of) the access valve 12 and subsequently has been moved inward along regulator 30 to the position shown, there-positioned for impending transport to a next access valve 12 (coupler body 131 being positioned above and just outward of transport wheels 121 as shown).

Figure 13D:
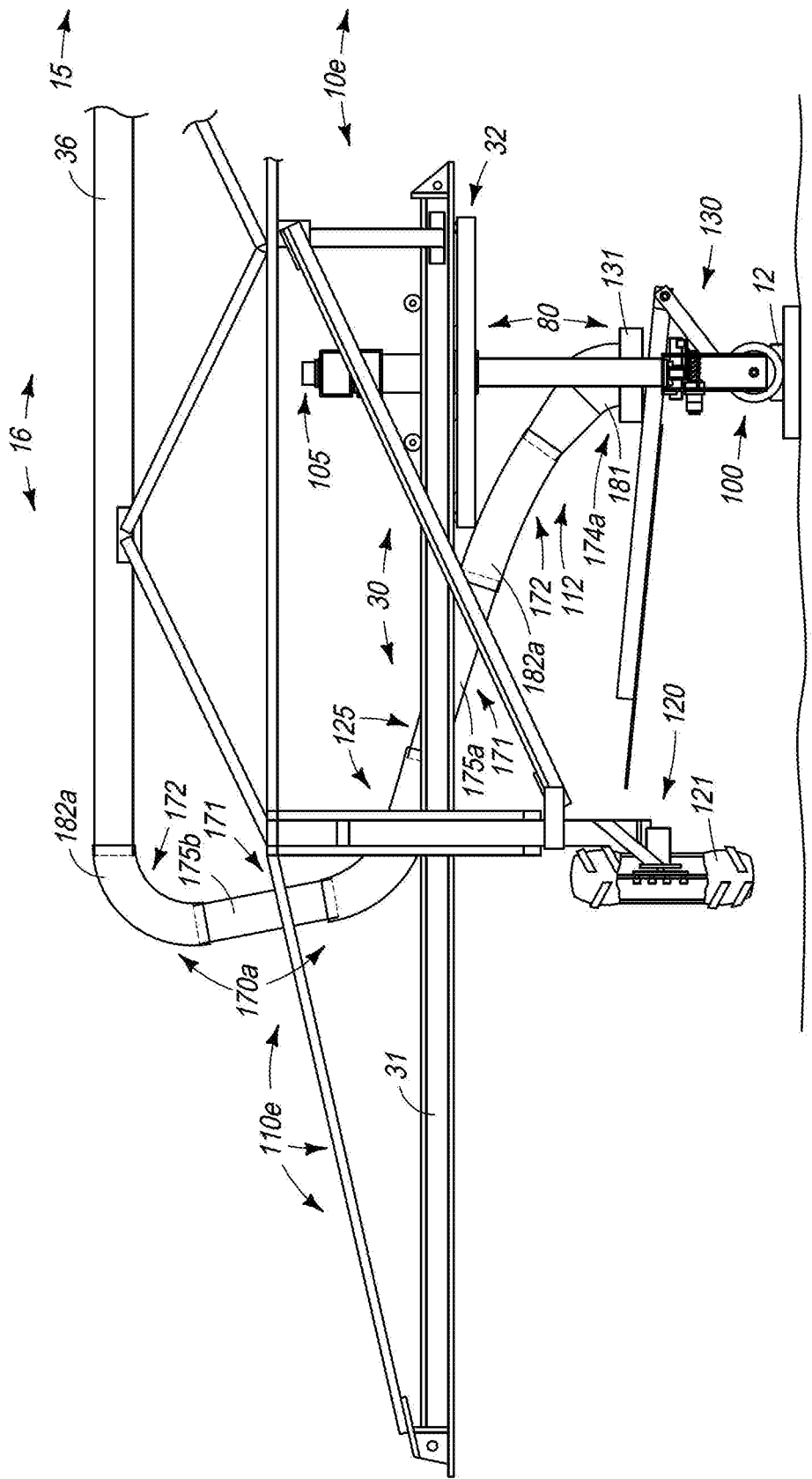

FIG. 13*d* illustrates the positioning extreme for this first example, conduits with flexible conduit 170*a*, where coupler body 131 has been connected prior to an access valve 12 and the subsequent irrigation travel of delivery pipe 15 has caused travel of trolley 32 along rails 31 such that trolley 32 and thus coupler body 131 are positioned innermost along regulator 30 as shown.

For this example of conduits with flexible conduit 170*a*, when coupler body 131 is positioned for impending transport as illustrated in FIG. 13*c*, the tight angle between conduits 175*a* and 175*b* has caused bendable hose 182*b*, residing between conduit 175*a* and 175*b*, to approach kinking. However, when positioned as in FIG. 13*c*, there is no water flow to retard and so a kinked or almost kinked bendable hose 182*b* when conduits with flexible conduit 170*a* resides in the position of FIG. 13*c* presents no problem to system operation (other than the potential for related hose wear).

A second example of conduits with flexible conduit 170, conduits with flexible conduit 170*b*, is illustrated in FIGS. 14*a* through 14*d*. The exemplary conduits with flexible conduit 170*b* is configured to reside mostly on a side of the valve coupler 130 toward the delivery pipe 15 (as shown). The exemplary conduits with flexible conduit 170*b* comprises two of rigid conduit 171, straight conduit 175*c* and curved conduit 180*a*. The exemplary conduits with flexible conduit 170*b* comprises three of flexible conduit 172, each of the three being bendable hose 182*a*. Conduits with flexible conduit 170*a* also comprises two of flow router 174.

(Conduits with flexible conduit 170*b* can be enhanced when comprising at least one of a conduit hanger 185.)

The exemplary straight conduit 175*c* is an 8-inch outside diameter aluminum round tube roughly 43 inches long. The exemplary curved conduit 180*a* is an 8-inch outside diameter aluminum round tube roughly 50 inches long and configured with a roughly 60 degree bend roughly in the middle as shown. (Curved conduit 180 can be employed to lessen the angle that a there-adjacent flexible conduit 171 need negotiate. For example, curved conduit 180*a* lessens the angle between conduit 175*c* and conduit 180*a* in the extreme illustrated in FIG. 14*c* by the 60 degrees of the bend in conduit 180*a*. In other words, what is a roughly 90 degree angle would be 150 degrees if conduit 180*a* were instead a straight conduit 175. An offset hinge 177 described later on can alternately be employed to assist a given flexible conduit 171 with negotiating an angle beyond say 90 degrees.)

Bendable hose 182*a* has been described above. (The three of exemplary bendable hose 182*a* each are an 8-inch inside diameter rubber hose having a helical reinforcement to prevent kinking during bending. Hose 182*a* exhibits a minimum bending radius of 15 inches and is about 38 inches in length.)

This second example, conduits with flexible conduit 170*b* (FIGS. 14*a* through 14*d*), comprises two examples of flow router 174. The first exemplary router 174, router 174*b*, is configured to reroute upward water flow through coupler body 131 to a direction substantially toward delivery pipe 15. Router 174*b* comprises an elbow 183. Elbow 183 is a 10-inch outside diameter 45-degree elbow and is welded atop coupler body 131 and oriented where the other end (upper end) of elbow 183 has been faced substantially toward delivery pipe 15 (thus away from mainline 11). One end of a first one of the three of bendable hose 182*a* is attached to elbow 183. (Attached via a reducer cone welded to elbow 183 to reduce the outside diameter from to 8-inch, a king nipple welded to the reducer cone and a hose clamp.) The other end of the bendable hose 182*a* is attached to straight conduit 175*c* (via a king nipple welded to the end of conduit 175*c* and a hose clamp).

The second exemplary router, router 174*c*, is configured to reroute upward water flow in the conveyance to the substantially horizontal direction in swing arm supply pipe 36 of the swing arm 16. Router 174*c* comprises an elbow 178. Elbow 178 is an 8-inch outside diameter 90-degree elbow 178 welded to the end of swing arm supply pipe 36 (the end remote from delivery pipe 15) and oriented with the remaining end of elbow 178 faced substantially downward. Elbow 178 has an 14-inch bend radius. (The 14-inch radius provides a gradual change in flow direction which minimizes pressure loss through the elbow.)

For this second example, conduits with flexible conduit 170*b*, one end of the second one of the three of bendable hose 182*a* is attached to elbow 178 (attached via a king nipple welded to the lower end of elbow 178 and hose clamp). The other end of the second one of bendable hose 182*a* is attached to curved conduit 180*a* (via a king nipple welded to the end of conduit 180*a*). One end of the third one of the three of bendable hose 182*a* is attached to the other end of curved conduit 180*a* (via king nipple). The other end of the third bendable hose 182*a* is attached to the end of straight conduit 175*c* opposite the conduit 175*c* end attached to elbow 183 (via king nipple and clamp).

Figure 14A:
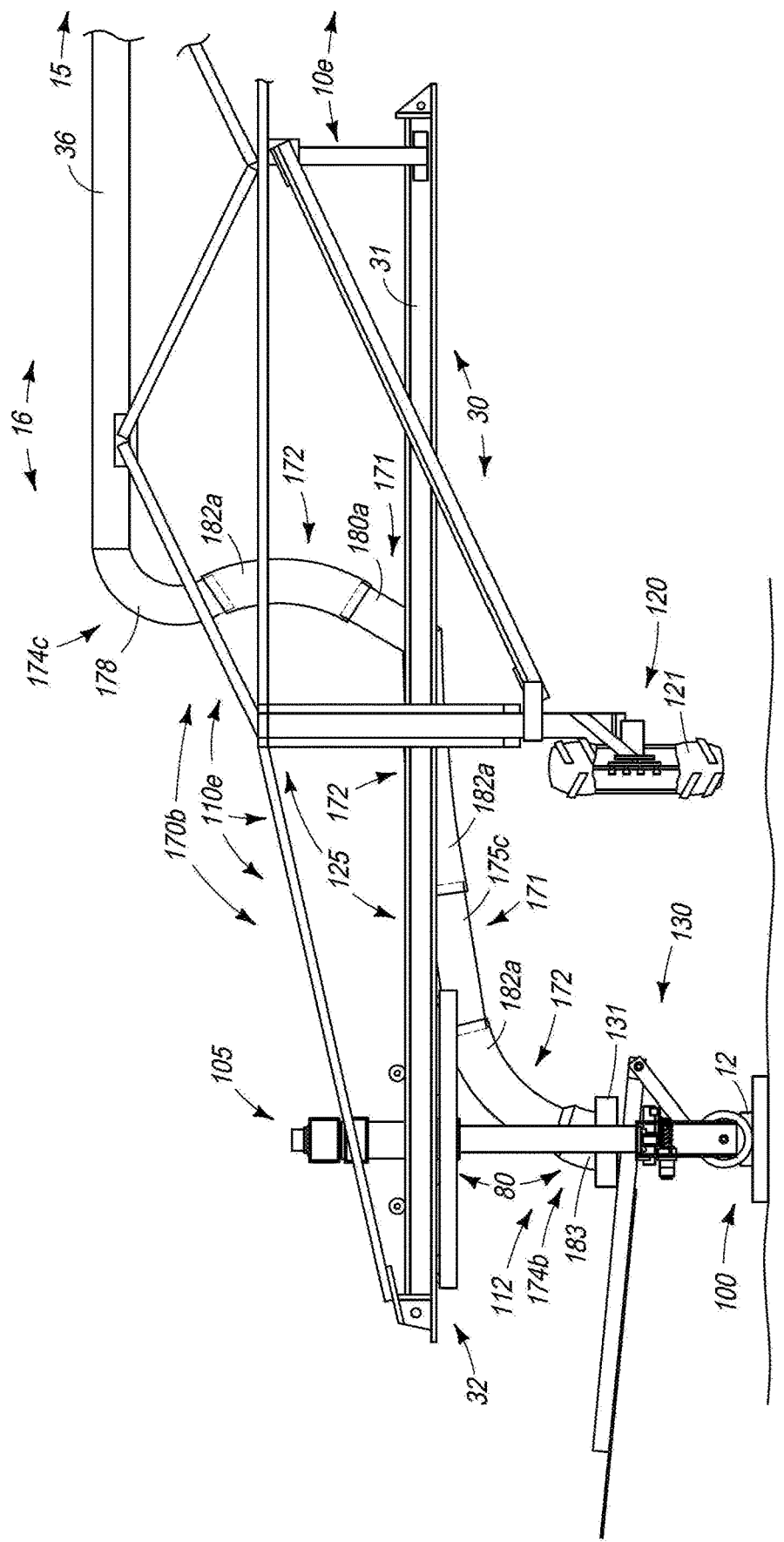
FIGS. 14a through 14d are side elevation views of the apparatus illustrated in FIG. 11 with the exception that the water conveyance 125 includes a conduits with flexible conduit and the conduits with flexible conduit is oriented mostly on a side of the coupler body toward the water delivery pipe.
Figure 14B:
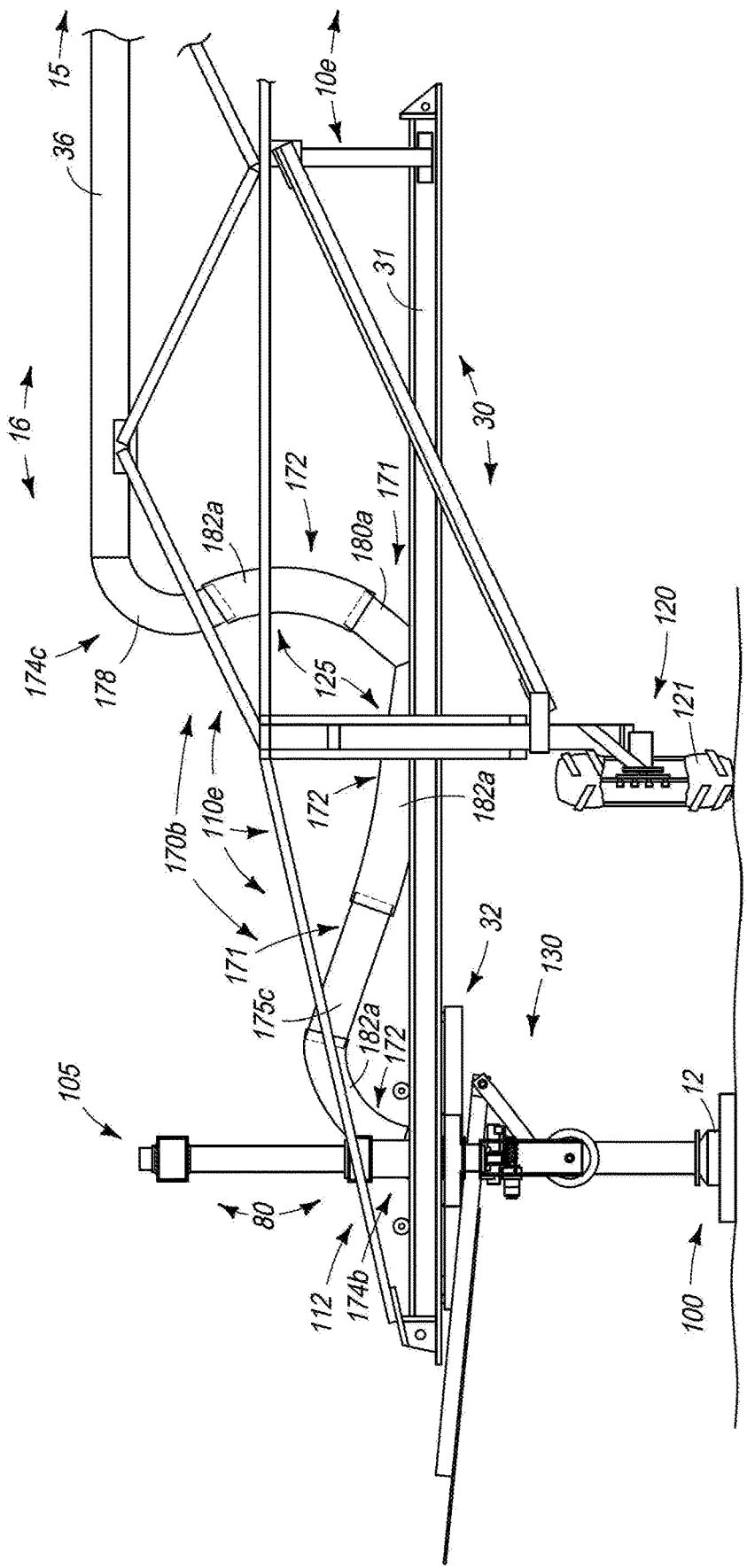
Figure 14C:
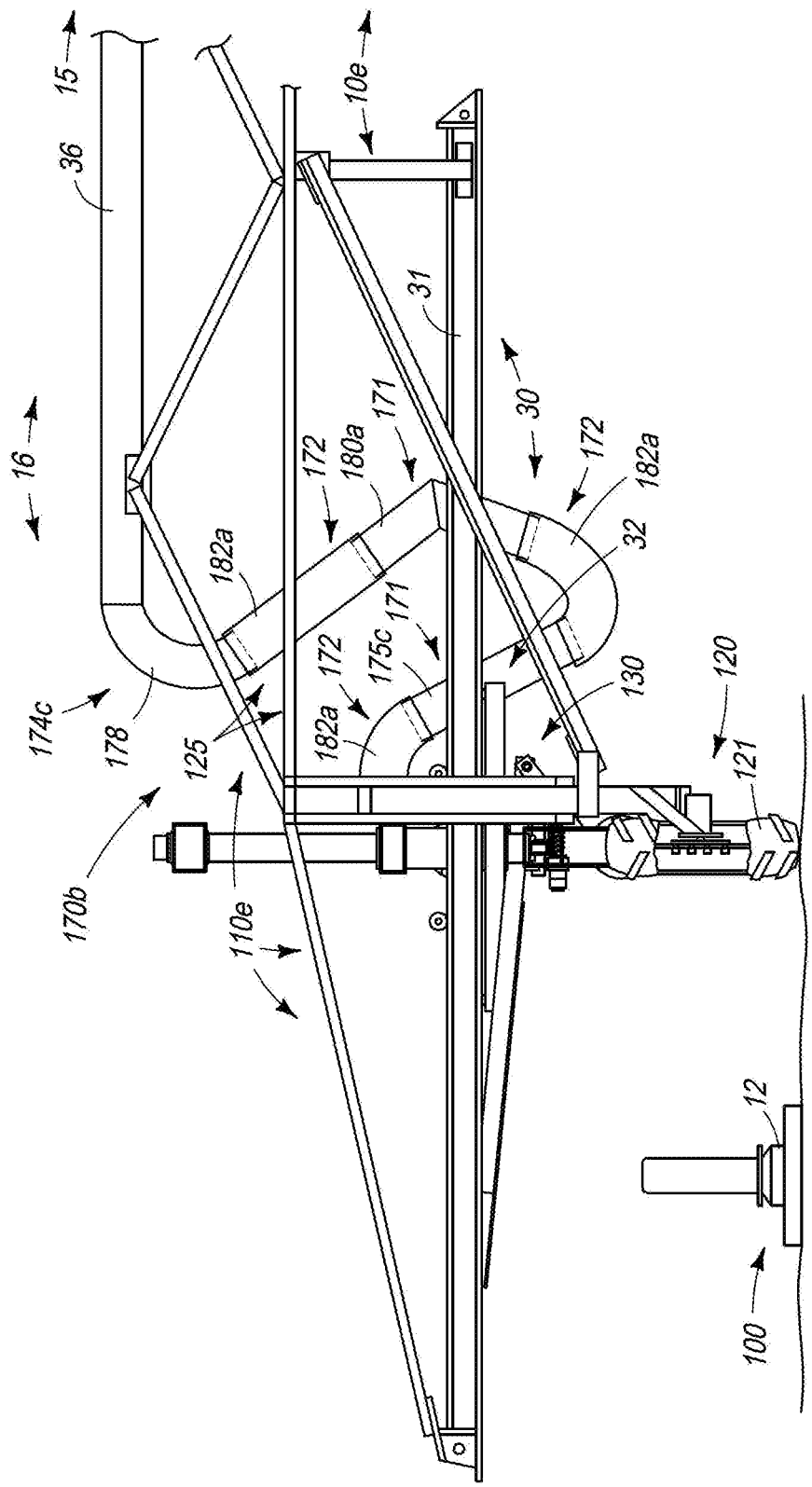
Figure 14D:
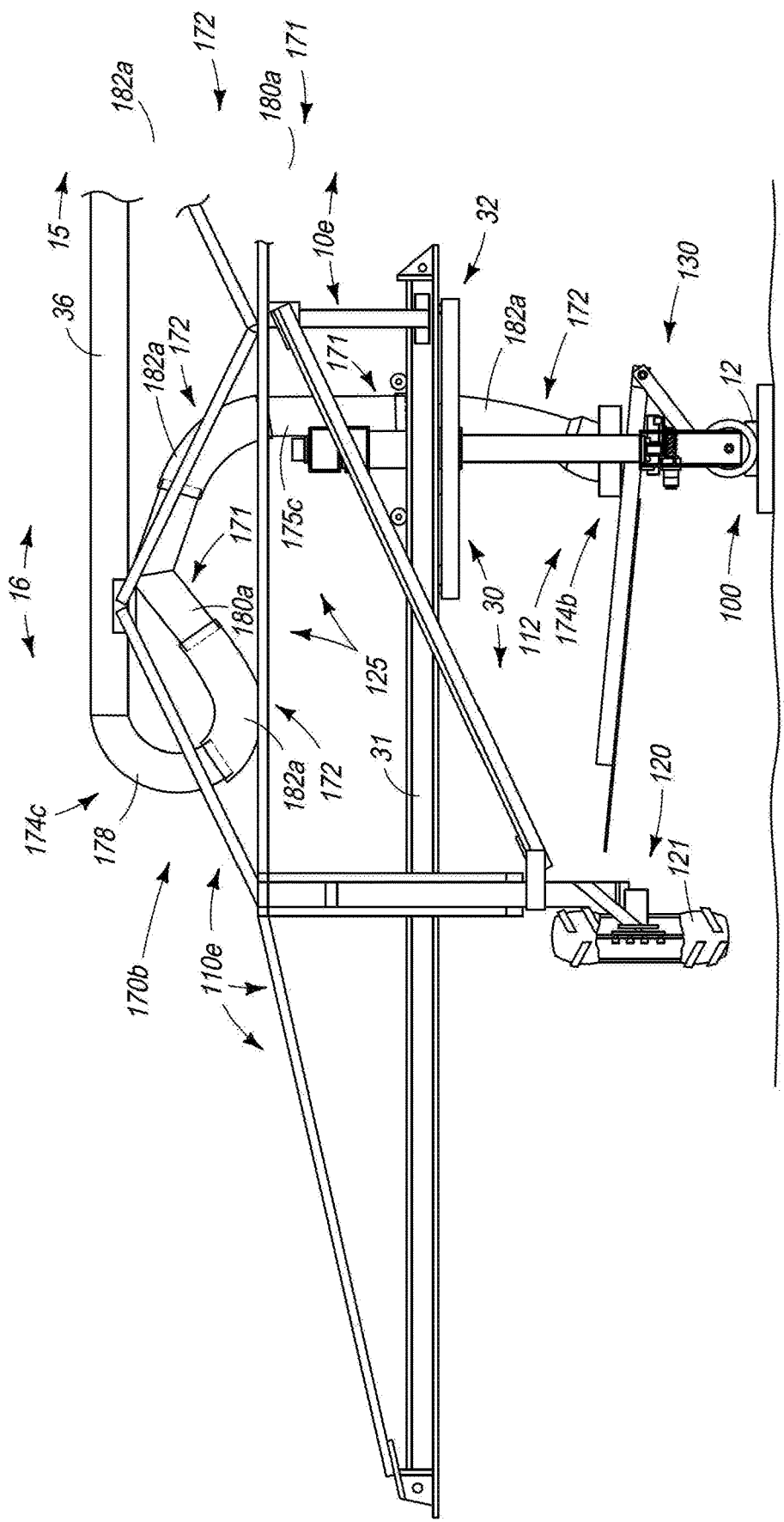

FIGS. 14*a*, 14*b*, 14*c* and 14*d* illustrate conduits with flexible conduit 170*b* (of this fifth example of this first embodiment of system 10, system 10*e*) oriented in the same positioning extremes described prior for FIGS. 13*a*, 13*b*, 13*c* and 13*d* respectively. (FIG. 14*a* illustrates coupler body 131 positioned outermost along swing arm length adjuster 30. FIG. 14*b* illustrates coupler body 131 having reached the outer end of regulator 30 and has been disconnected from the access valve 12. FIG. 14*c* illustrates coupler body 131 having been moved inward along regulator 30 to the position shown for transport to a next access valve 12. FIG. 14*d* illustrates coupler body 131 having been connected to an access valve 12 with delivery pipe 15 having traveled causing body 131 to be moved innermost along regulator 30.)

A third example of conduits with flexible conduit 170, conduits with flexible conduit 170*c*, is illustrated in FIGS. 15*a* through 15*d*. The exemplary conduits with flexible conduit 170*c* is the exemplary conduits with flexible conduit 170*a* illustrated in FIGS. 13*a* through 13*d* and further comprising three of a conduit hanger 185. (Thus the exemplary conduits with flexible conduit 170*c* is configured to reside mostly on a side of the valve coupler 130 away from the delivery pipe 15 and comprises straight conduit 175*a*, straight conduit 175*b*, two of bendable hose 182*a*, bendable hose 182*b* and elbow 181 of flow router 174*a*.)

Conduit hanger 185 provides to transfer load. This third example of conduits with flexible conduit 170, conduits with flexible conduit 170*c*, comprises two examples of conduit hanger 185, a centered hinge 176 and an offset hinge 177. Each of these examples of conduit hanger 185 is welded to one end of one of rigid conduit 171 with the other end attached to a member that the welded-to end of the conduit receives water from or supplies water to (hydraulically communes with). Hanger 185 thus enables the welded-to rigid conduit 171 to swing relative to said attached-to member and provides to transfer load to or from the attached-to member thus alleviating load from the flexible conduit 172 that resides there-between. Load transferred can include the weight of the welded-to conduit 171, the weight of the attached-to member (which can be another conduit 171) and the weight of the water residing inside one or both of conduit 171. (One or more of conduit hanger 185 can be employed on any embodiment where a respective one or more of conduit 171 are employed. For example, conveyance 125 of conduits with flexible conduit 170*b* can employ one or more of hanger 185. For example, conveyance 125 of trolley supported conveyance 205, described later, can employ one or more of hanger 185.)

The two examples of hanger 185, centered hinge 176 and offset hinge 177, also provide to maintain the welded-to conduit 171 aligned in a substantially vertical plane with the respective attached-to member. Hanger 185 thus provides that the welded-to conduit 171 travels/swings relative to said attached-to member in said substantially vertical plane which eliminates a horizontal sway load that would otherwise be placed upon the associated flexible conduit 172, that sway load caused by wind and caused by acceleration, deceleration and chuckholes encountered during the connector transit akin to transporter 120. The transfer of load by hanger 185 greatly reduces the wear and thus the need to maintain/replace the associated flexible conduit 172.

Two of exemplary centered hinge 176 are illustrated in FIGS. 15*a* through 15*d*. One of the exemplary centered hinge 176 is located between straight conduit 175*a* and elbow 181 of flow router 174*a* (elbow 181 welded to coupler body 131). The other of the exemplary centered hinge 176 is located between straight conduit 175*b* and swing arm supply pipe 36.

The two of exemplary centered hinge 176 are essentially identical to each other (with the exception of the thickness dimension of any a given spacer 187 employed). Each of the two of exemplary centered hinge 176 comprises two pairs of hinges. One of the two pairs is shown. The other of the two pairs is located behind the shown pair on the opposite/back side of conveyance 170c. Each of the two pairs of hinges comprises two lengths of a flat bar 179. Flat bar 179 is approximately 31 inches long, three inches wide and three-eights inches thick. For each of the two lengths of flat bar 179, one of the two lengths is attached/welded to the respective conduit 171 such that the length of that flat bar 179 is linearly aligned with (centered along) the length axis of the length of conduit 171 and the other length of flat bar 179 is attached/welded to the member that the end of the respective conduit 171 hydraulically communes with, said other length of flat bar 179 also linearly aligned with (centered along) the length axis of the communing member. (As can be seen in the illustrations, for hinge 176 welded to straight conduit 175a, said other length of flat bar 179 is attached/welded to elbow 181 of flow router 174a. For hinge 176 welded to straight conduit 175b, said other length of flat bar 179 is attached/welded to swing arm supply pipe 36.) Each length of flat bar 179 has a one-inch hole located near its unattached end. For each pair of flat bar, the bar 179 attached/welded to the respective conduit 171 and the bar attached/welded to the communing member are joined at their respective unattached ends via a one-inch diameter stainless steel pin, pin 189, residing inside both respective one-inch holes having been mated up. Thus hinge 176 hinges/swings about the one-inch diameter pin and thus the respective conduit 171 hinges/swings about the one-inch diameter pin. Each flat bar 179 is attached/welded to the respective conduit 171 or respective communing member via a spacer 187. Spacer 187 is located between flat bar 179 and said the respective conduit 171 or respective communing member. So locating each spacer 187 provides sufficient distance between the respective conduit 171 or respective communing member and the associated flat bar 179 to enable one of flexible conduit 172 to reside between the two pairs of hinges that make up centered hinge 176. (The thickness of given ones of spacer 187 is varied so that for example a flat bar 179 of a respective conduit 171 and a flat bar 179 of a respective communing member are positioned to overlap with holes aligned so pin 189 can slide therethrough and join them.)

An example of offset hinge 177 is illustrated in 15a through 15d. The exemplary offset hinge 177 is located between straight conduit 175a and straight conduit 175b. The exemplary offset hinge 177 is constructed similar to hinge 176. i.e. two pairs of hinges, each pair of hinges comprising two flat bar with each flat bar having a one-inch hole in its free end and pin 189 fitted into the hole thus joining the free ends to swing relative to each other. However, each of the four flat bar employed by hinge 177 is a flat bar 188. Flat bar 188 is approximately 37 inches long, three inches wide and three-eights inches thick. Also, unlike flat bar 179 of centered hinge 176, the four lengths of flat bar 188 are not attached in linear alignment with the respective member but instead are attached at an angle (roughly 30 degrees from linear alignment) to their respective conduit (straight conduit 175a or straight conduit 175b). Attaching each flat bar 188 at an angle creates an offset hinge point as shown. This offset provides that hinge 177 enables conduits 175a and 175b to swing well beyond 90 degrees with the associated flexible conduit 172 remaining unkinked. (Conduits 175a and 175b in linear alignment represents a zero degree angle.)

(Hinge 176 is ideal when the attached conduit 171 is swung back and forth up to 90 degrees each direction across linear alignment with the attached-to member, linear alignment being zero degrees between conduit 171 and attached-to member. However, if an attached conduit 171 is to be swung between zero degrees to beyond 90 degrees, offset hinge 177 can be better suited in place of hinge 176 to remediate stress on flexible conduit 172. Also, embodiments of conveyance, including conveyance 125 of this conduits with flexible conduit 170c, can employ other than three of conduit hanger 185. Each hanger 185 employed relieves a different load than another hanger 185 employed in the same conveyance 125. Therefore, for a given conveyance 125, for example, one of a given hanger 185 can be employed where the load relieved is significantly large and thus no other hanger 185 need be employed.)

Figure 15A:
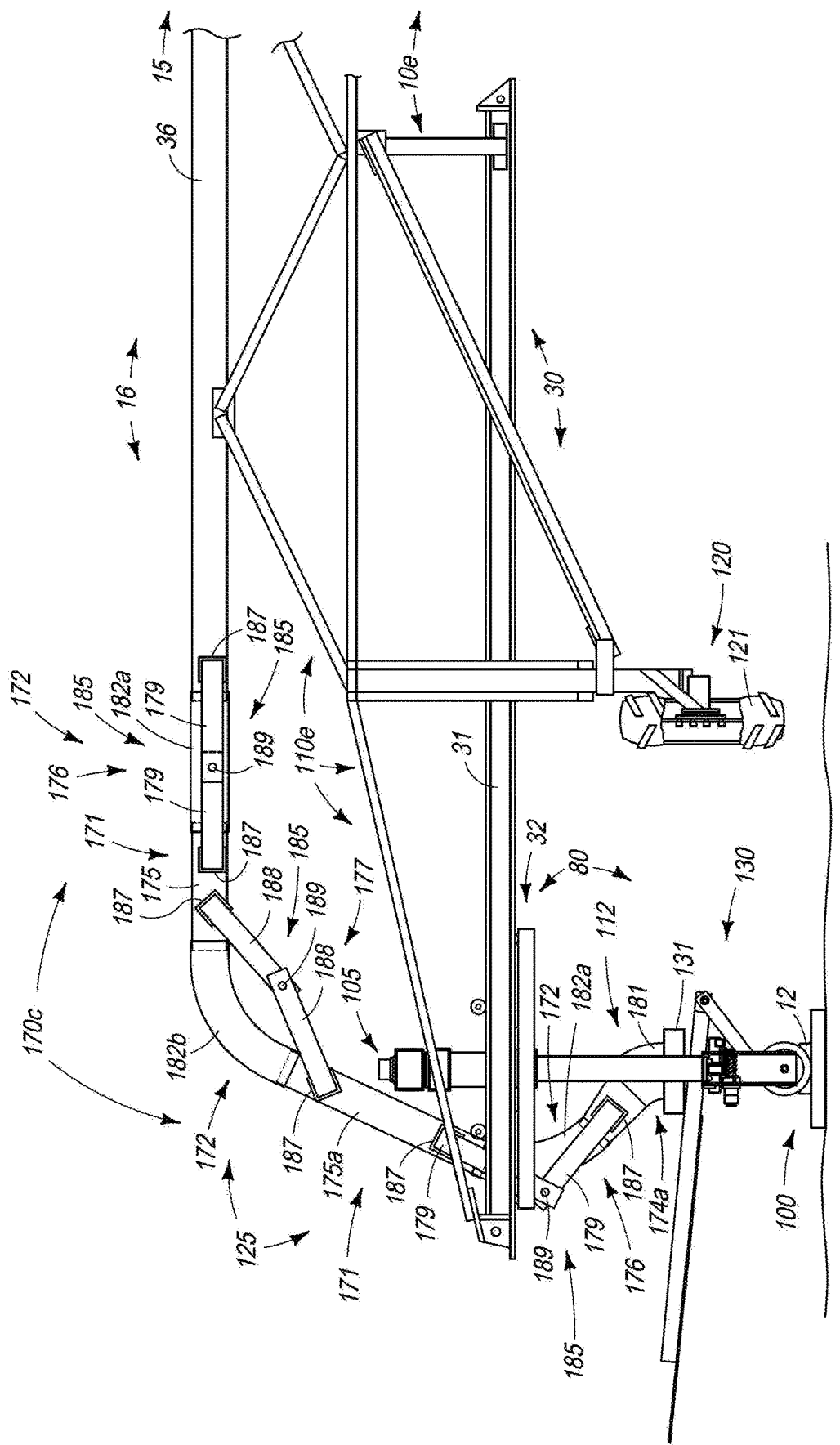
FIGS. 15a through 15d are the side elevation views of the apparatus illustrated in FIGS. 13a through 13d with the exception that the conduits with flexible conduit includes three conduit hangers.
Figure 15B:
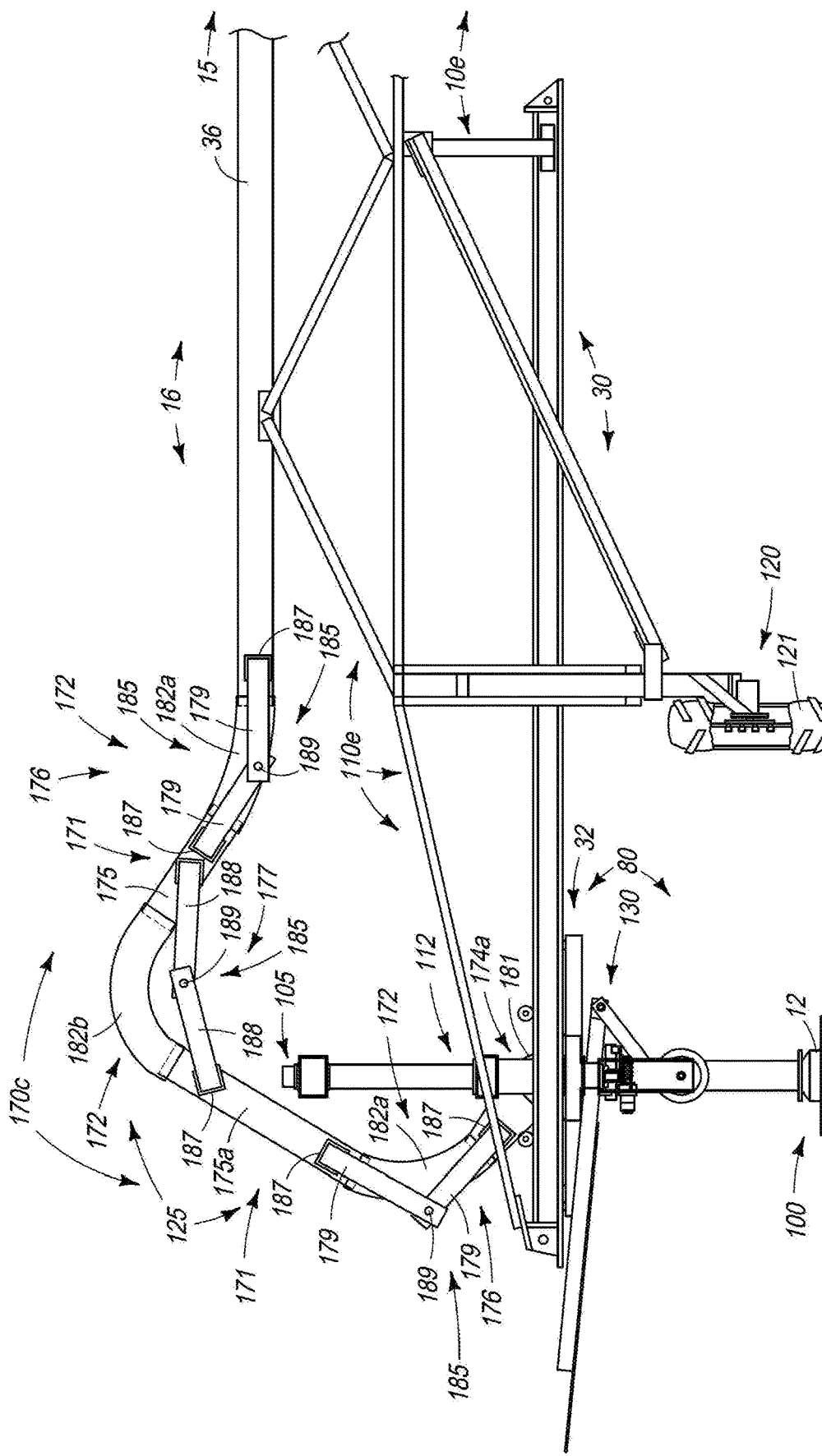
Figure 15C:
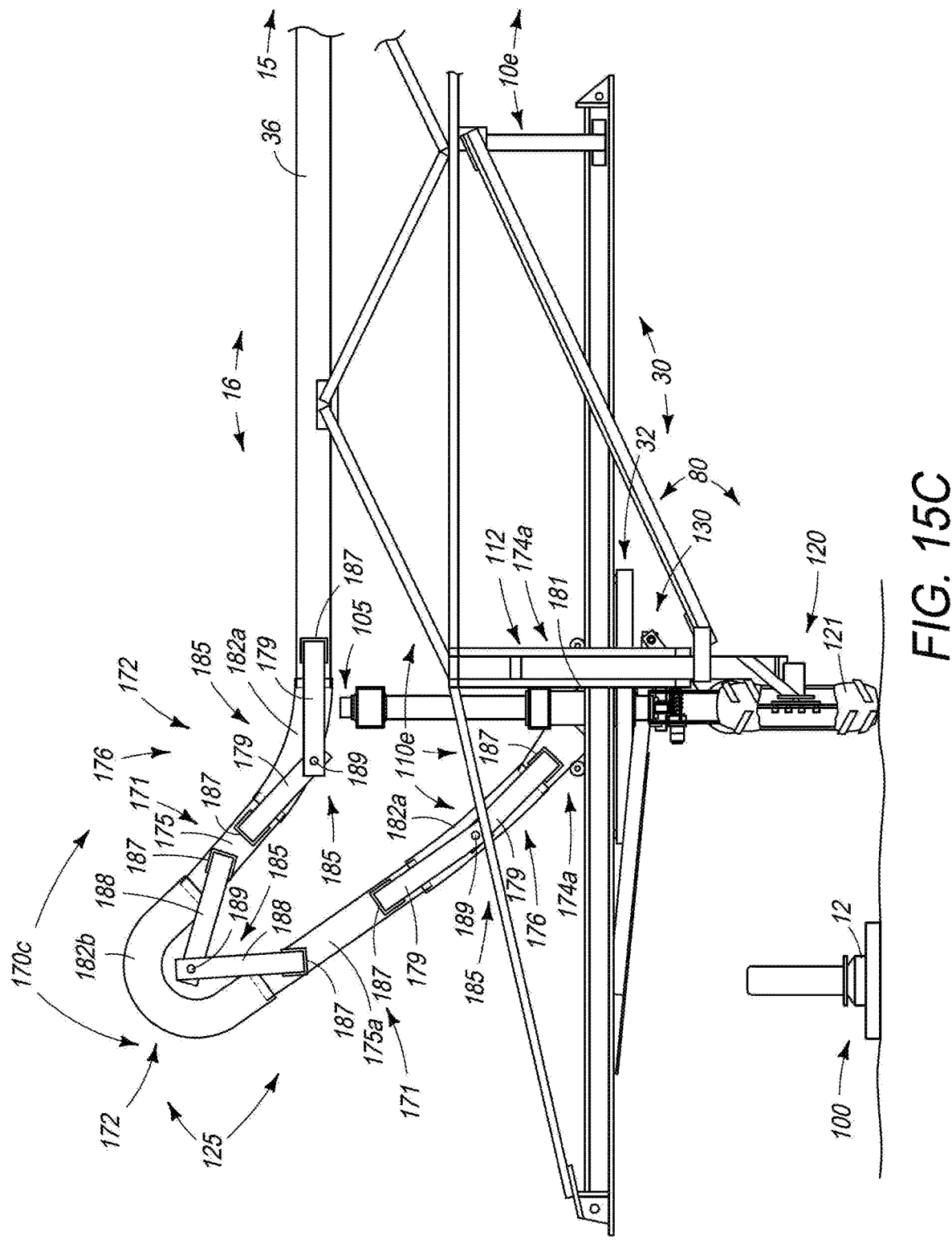
Figure 15D:
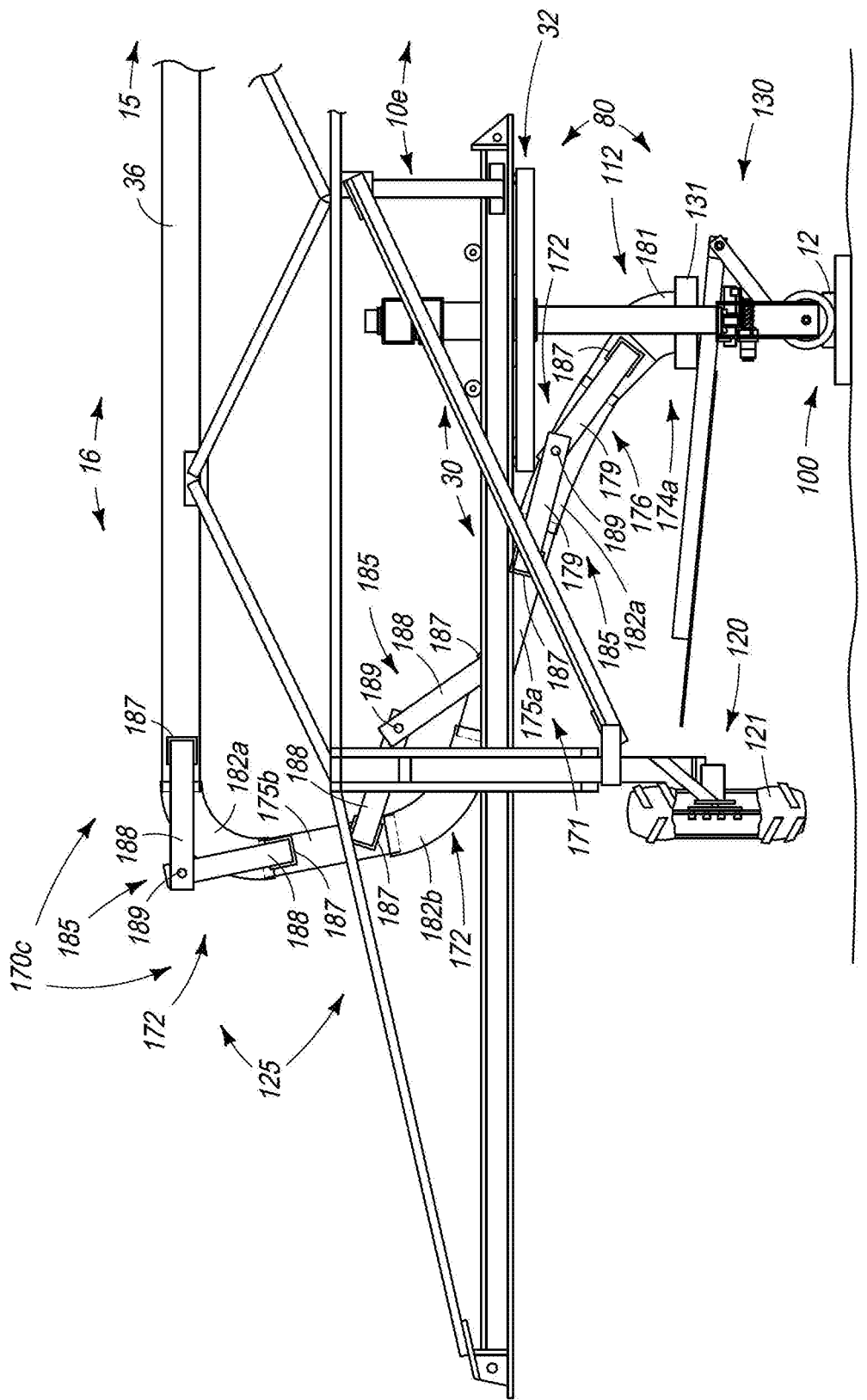
Figure 16:
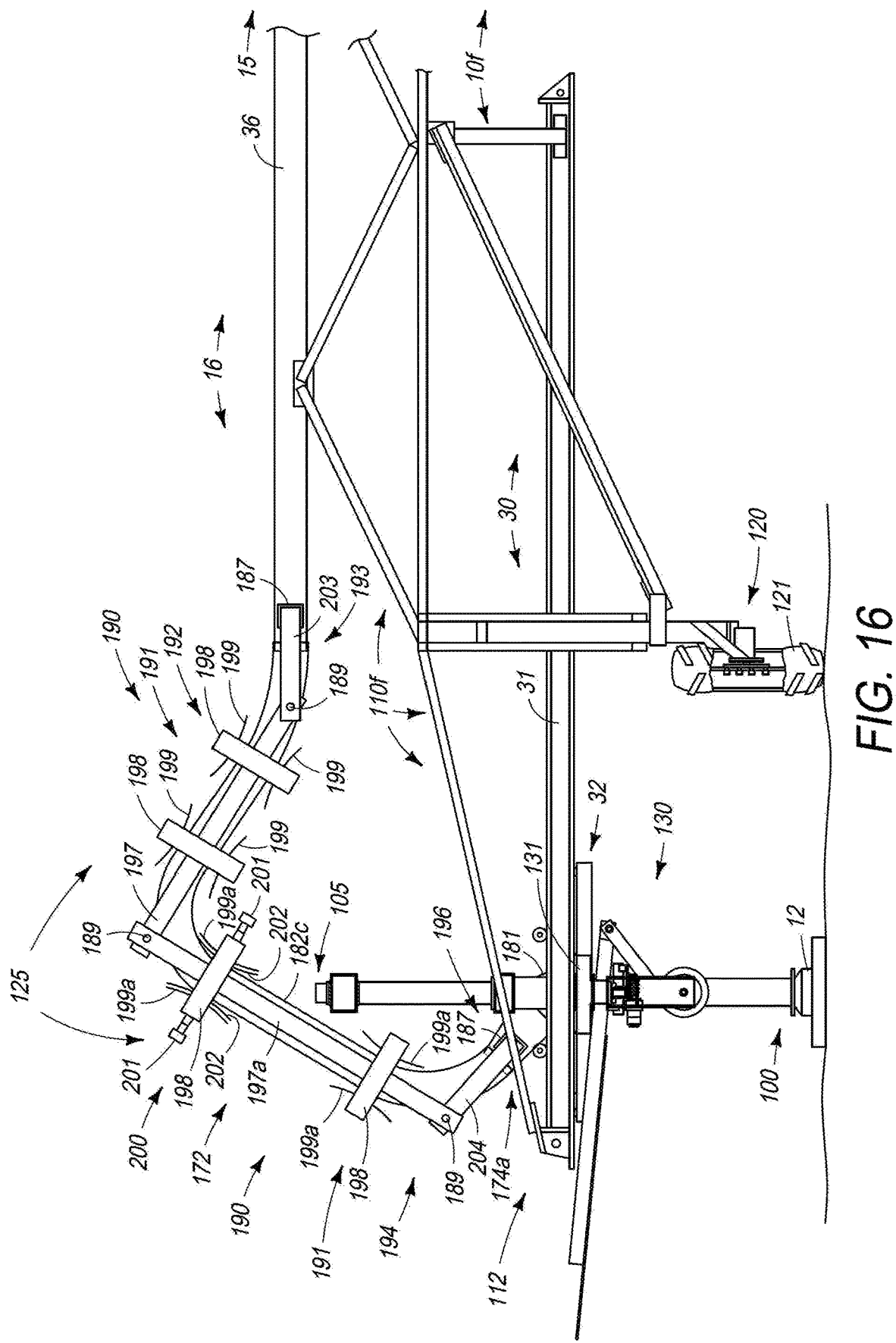
FIG. 16 is a side elevation view of the apparatus illustrated in FIG. 13b with the exception that the water conveyance 125 includes a caged flexible hose.

FIGS. 15a, 15b, 15c and 15d illustrate conduits with flexible conduit 170c (of this fifth example of this first embodiment of system 10, system 10e) oriented in the same positioning extremes described prior for FIGS. 13a, 13b, 13c and 13d respectively (and for FIGS. 14a, 14b, 14c and 14d respectively). (FIG. 15a illustrates coupler body 131 positioned outermost along swing arm length adjuster 30. FIG. 15b illustrates coupler body 131 having reached the outer end of regulator 30 and has been disconnected from the access valve 12. FIG. 15c illustrates coupler body 131 having been moved inward along regulator 30 to the position shown for transport to a next access valve 12. FIG. 15d illustrates coupler body 131 having been connected to an access valve 12 with delivery pipe 15 having traveled causing body 131 to be moved innermost along regulator 30.)

A sixth example of this first embodiment, system 10f, is illustrated in FIG. 16. This sixth example comprises linear-move water delivery pipe assembly 15 and single coupler automated connector 112 and wherein connector 112 comprises independent vertical coupler connector 110f. Connector 110f comprises swing arm 16, transporter 120, valve coupler 130, swing arm length adjuster 30, pivoting ground support 100 and water conveyance 125. For this sixth example, valve coupler 130 comprises independent vertical coupler travel 105 and coupler travel 105 comprises vertical coupler travel 80 (coupler travel 80 described in the above fourth example). (FIG. 30 of U.S. Pat. No. 9,301,459 can be referenced as a generally accurate end view of FIG. 16, though conveyance 125 of this application is not therein represented.)

For this sixth example, water conveyance 125 comprises a caged flexible conduit 190. Caged flexible conduit 190 functions to operably flow water between a coupler and a swing arm, the coupler movable relative to the swing arm. One example of caged flexible conduit 190 is illustrated in FIG. 16. The exemplary caged flexible conduit 190 is configured to reside mostly on a side of the valve coupler 130 away from the delivery pipe 15 (as shown). The exemplary caged flexible conduit 190 comprises one of flexible conduit 172, one of flow router 174 and a hose cage 191. This example of caged flexible conduit 190 can comprise and at least one of a flexible conduit holder 200. (Caged flexible conduit 190 can comprises more than one of flexible conduit 172 and hose cage 191 can comprise more than two cages. Also, water conveyance 125 of the above-described third example of this first embodiment, as well as other embodiments of system 10, for examples embodiments comprising independent vertical coupler connector 110, can comprise caged flexible conduit 190.)

For this example of caged flexible conduit 190, flexible conduit 172 of caged flexible conduit 190 comprises bendable hose 182c. Bendable hose 182c is essentially identical to the prior-described bendable hose 182a as well as bendable hose 182b except longer in length. Bendable hose 182c is roughly 16 feet long.

For this example of caged flexible conduit 190, caged flexible conduit 190 comprises one of flow router 174, flow router 174a comprising elbow 181, both described prior. (The exemplary router 174a provides to reroute upward water flow through coupler body 131 to a direction substantially away from delivery pipe 15.)

For this example of caged flexible conduit 190 comprises a hose cage 191. The exemplary hose cage 191 provides additional support to a flexible hose. The exemplary hose cage 191 comprises an upper cage 192, a lower cage 194, a swing arm mount 193, a coupler body mount 196 and six of pin 189 and four of spacer 187.

Upper cage 192 comprises two of a cage strut 197. Strut 197 is a three inch wide by three-eights inch thick by roughly 85 inch long aluminum bar. One of the two of strut 197 is shown. The other of the two of strut 197 is located behind the shown strut 197, the other strut 197 located on the opposite/back side of the conveyance. Each end of each of the two of strut 197 has a one-inch hole.

Upper cage 192 comprises four of a cross member 198. Cross member 198 is a three inch wide by three-eights inch thick by roughly 20 inch long aluminum bar. Two of the cross member 198 are shown. Each of the other two of cross member 198 is located behind a respective cross member 198 shown, each of the other two located on the opposite/back side of the conveyance. The length of each cross member 198 is positioned perpendicular to the respective strut 197 as shown and there welded to the strut 197.

Upper cage 192 comprises four of a curved guide 199. Curved guide 199 is a one-quarter inch thick by 10-inch wide by 11-inch long aluminum plate that has been slightly rolled in the width direction as shown. Two of the four of curved guide 199 are positioned at opposite ends of one of the sets of cross member 198 with the other two of curved guide 199 positioned at opposite ends of the other of the sets of cross member 198 as shown, all there-welded in place.

Lower cage 194 is mostly identical to upper cage 192 with two exceptions. Firstly, lower cage 194 comprises a cage strut 197a. Strut 197a is identical to strut 197 with the exception that strut 197a is longer. Strut 197a is roughly 108 inches long. Secondly, lower cage 194 comprises four of a curved guide 199a. Curved guide 199a is identical to curved guide 199 with the exception that curved guide 199a is three-quarter inch longer. (Each guide 199a is made longer so that the one-inch holes of cage 192 and cage 194 overlap so that one of pin 189 can be there-placed, thus two of pin 189 holding the two cages together so they may swing relative to each other in a vertical plane.)

Swing arm mount 193 comprises two of a bar 203, bar 203 is a three inch wide by three-eights inch thick by roughly 35 inch long steel bar. Only one of the two of bar 203 is shown with the other located behind the one shown. Each of the two bars is welded to swing arm pipe 36 with a spacer 187 located there-between to afford sufficient clearance for hose 182c. Each of the two of bar 203 has a one-inch hole at their free end so that the upper end of the respective strut 197 can be slid inside the respective bar 203 and one of pin 189 can be there-placed, thus two of pin 189 pining upper cage 192 to swing arm mount 193 so upper cage 192 can swing in a vertical plane relative to swing arm pipe 36.

Coupler body mount 196 comprises two of a bar 204, bar 204 is a three inch wide by three-eights inch thick by roughly 35 inch long aluminum bar. Only one of the two of bar 204 is shown with the other located behind the one shown. Each of the two of bar 204 is welded to elbow 181 of flow router 174a with a spacer 187 located there-between to accommodate the taper of the reducer cone affixed to elbow 181 affording sufficient clearance for hose 182c. Each of the two of bar 204 has a one-inch hole at their free end so that the lower end of the respective strut 197a can be slid inside the respective bar and one of pin 189 can be thereplaced, thus the two of pin 189 pining lower cage 194 to elbow 181 and thus to coupler body 121 enable lower cage 194 to swing in a vertical plane relative to coupler body 121.

This example of caged flexible conduit 190 can comprise and at least one of a flexible conduit holder 200. Flexible conduit holder 200 provides to transfer load. An example of flexible conduit holder 200 is illustrated in FIG. 16. The exemplary holder 200 comprises two of an adjuster screw 201. One adjuster screw 201 is fitted at the middle of one of upper curved guide 199a of lower cage 194 with the other adjuster screw fitted at the middle of the opposing curved guide 199a as shown. Turning each adjuster screw 201 in the appropriate direction moves a respective curved corrugated plate 202 attached to the inside end of the respective adjuster screw 201 toward hose 182c until the corrugated plate 202 contacts the side of hose 182c. Both of plate 202 in contact with hose 182c acts to hold hose 182c in place thus preventing future sagging of hose 182c due to gravity.

FIG. 16 illustrates coupler body 31 having reached the outer end of regulator 30 and having been disconnected from the access valve 12 and presents the extreme in positioning to best show caged flexible conduit 190 of this system 10f. (System 10f operates like system 10e and thus likewise achieves the extremes in positioning illustrated in FIGS. 13a, 13b, 13c and 13d.)

A seventh example of this first embodiment, system 10g, is illustrated in FIGS. 17a, 17b, 17c and 17d. This seventh example comprises linear-move water delivery pipe assembly 15 and single coupler automated connector 112 and wherein connector 112 comprises independent vertical coupler connector 110g. Connector 110g comprises swing arm 16, transporter 120, valve coupler 130, swing arm length adjuster 30, pivoting ground support 100 and water conveyance 125. For this seventh example, valve coupler 130 comprises independent vertical coupler travel 105 and coupler travel 105 comprises vertical coupler travel 80 (coupler travel 80 described in the above fourth example).

For this seventh example, water conveyance 125 comprises a trolley supported conveyance 205. Trolley supported conveyance 205 functions to operably flow water between a coupler and a swing arm, the coupler movable relative to the swing arm. One example of trolley supported conveyance 205 is illustrated in FIGS. 17a, 17b, 17c and 17d. The exemplary trolley supported conveyance 205 is configured to reside mostly on a side of valve coupler 130 toward the delivery pipe 15 (as shown). The exemplary trolley supported conveyance 205 comprises a swing arm to trolley supported conveyance 206 and a coupler body to trolley supported conveyance 207. (Trolley supported conveyance 205 can alternately be configured to reside mostly on a side of valve coupler 130 away from the delivery pipe 15. Also, other embodiments of system 10 can be configured to comprise trolley supported conveyance 205. Also, one benefit of trolley supported conveyance 205, i.e. routing conveyance 125 from swing arm pipe 36 to coupler body 131 via trolley 32, is the relief of load attributed to the weight of conveyance 125 from the valve coupling hardware of valve coupler 130. An example of said valve coupling hardware is illustrated in FIG. 29 of U.S. Pat. No. 9,301, 459.)

The exemplary swing arm to trolley support conveyance 206 of trolley supported conveyance 205 comprises prior-described components employed by the prior-described conduits with flexible conduit 170b (FIGS. 14a through 14d), those components being two of rigid conduit 171 (straight conduit 175 and curved conduit 180), three of flexible conduit 172 (each of the three being bendable hose 182a) and flow router 174b. (Straight conduit 175 employed in conveyance 205 has a different length than conduit 175c employed in conveyance 170b. Curved conduit 180 employed by conveyance 205 has a different length and a different bend angle than curved conduit 180a employed in conveyance 170b. Also, swing arm to trolley support conveyance 206 can alternately be some other conveyance. As but one example, conveyance 206 can be a flexible hose 172 attached to swing arm pipe 36 via a router 174 and attached at the other end to trolley 32. Said alternate would still provide the above-described benefit of relief of load attributed to the weight of conveyance 125 from the valve coupling hardware of valve coupler 130.)

The exemplary coupler body to trolley support conveyance 207 comprises a trolley conduit support 210, a coupler-to-trolley conduit 216 and the prior-described elbow 183 of flow router 174b. For this example of coupler body to trolley support conveyance 207 (of trolley supported conveyance 205), trolley conduit support 210 comprises a hose union 211, two of a union mounting plate 212 and a check valve 213. Hose union 211 is an eight-inch outside diameter aluminum pipe roughly 22 inches long. Mounting plate 212 is a one-quarter inch thick aluminum plate roughly 20 inches long with one end cut with a 90 degree indent to fit welded to the side and bottom of cross tube 215 and the opposite end welded to a side of hose union 211 as shown. (One of mounting plate 212 is shown and the second of mounting plate 212 is located directly behind the plate 212 shown, the second plate 212 welded to the opposite side of union 211, thus union 211 resides sandwiched between the two of plate 212. Also, FIG. 29 of U.S. Pat. No. 9,301,459 can be referenced as a generally accurate end view showing cross tube 215.) One end of one of bendable hose 182a is attached to straight conduit 175 with the remaining end of hose 182a attached to the upper end of union 211 as shown. Check valve 213 is attached to the bottom end of hose union 211. Check valve 213 functions to allow water flow from coupler body 131 to flow to swing arm pipe 36 while preventing water from flowing in the opposite direction (backward). Check valve 213 can be a conventional plumbing component. (In an alternate configuration, coupler body to trolley support conveyance 207 can employ flexible conduit 172 in place of collapsible hose 221, flexible conduit 172 configured, for example, with flow router 174 directing flow away from delivery pipe 15 and conduit 172 routed up and over cross tube 215 to then be attached to hose union 211. Coupler body to trolley support conveyance 207 can be any contrivance to between coupler body 131 and swing arm to trolley support conveyance 206.)

For this example of coupler body to trolley support conveyance 207 (of trolley supported conveyance 205), coupler-to-trolley conduit 216 comprises a collapsible hose 221. Collapsible hose 221 is an eight-inch inside diameter lay flat hose roughly 30 inches long. (Lay flat hose can be a conventional hose designed to handle pressurized water and to collapse when absent pressure enabling the then flat hose to be easily rolled into a coiled.) One end of collapsible hose 221 is attached to elbow 183 of flow router 174b via a king nipple and clamp. The remaining end of collapsible hose 221 is attached to the bottom side of check valve 213 via a check valve and clamp as shown.

Figure 17A:
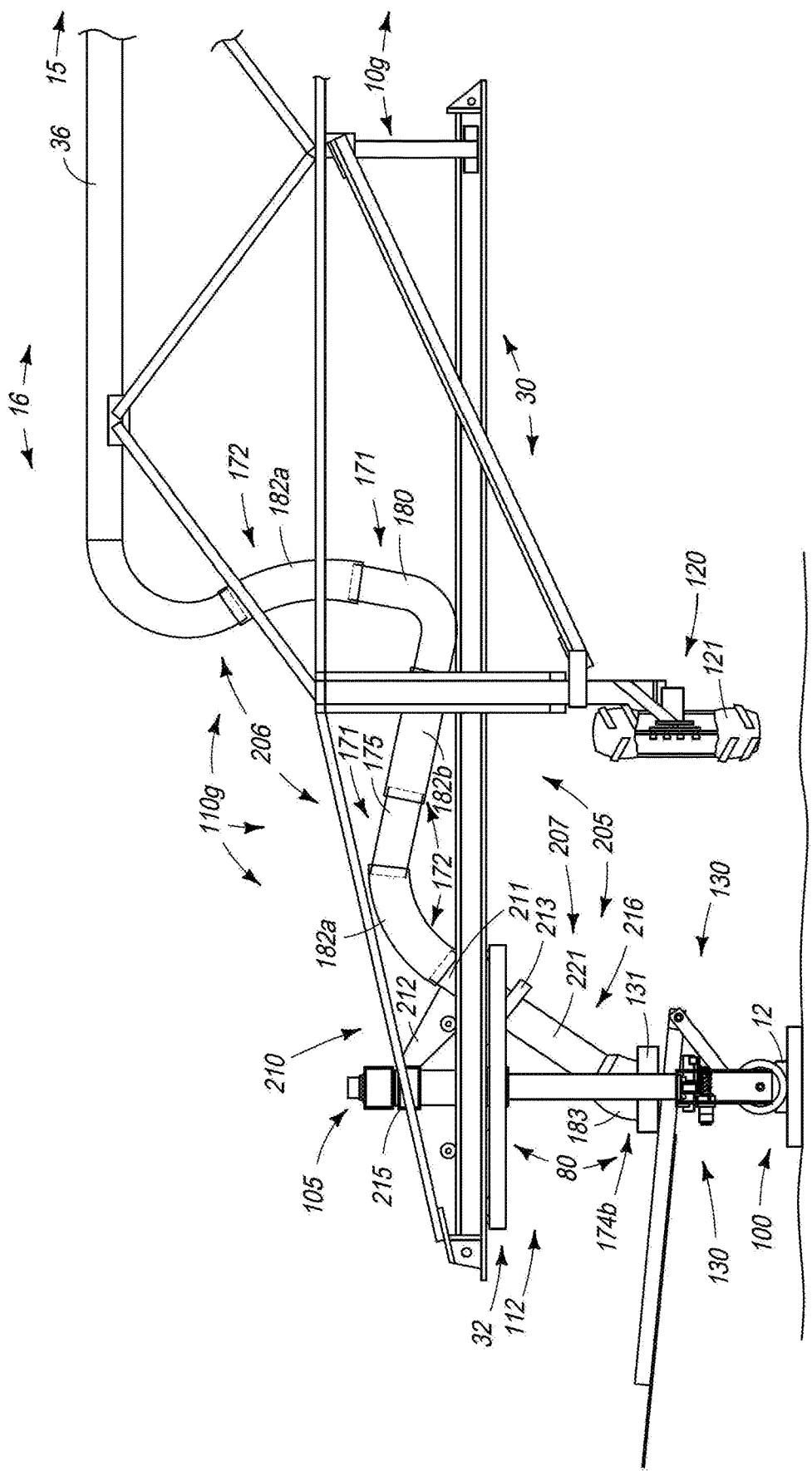
FIGS. 17a through 17d are side elevation views of the apparatus illustrated in FIG. 1 with the exception that the water conveyance 125 includes a trolley supported conveyance.
Figure 17B:
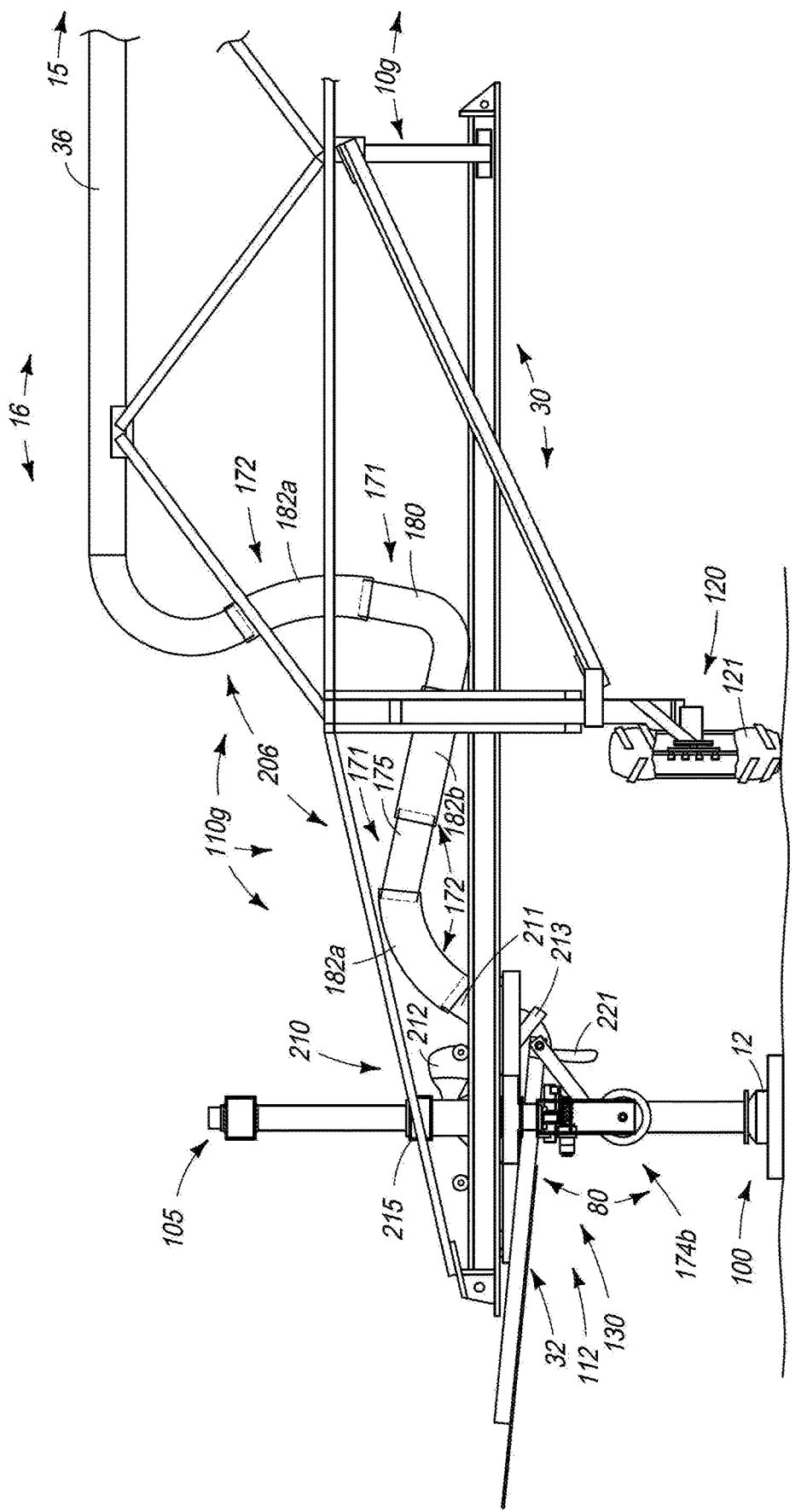
Figure 17C:
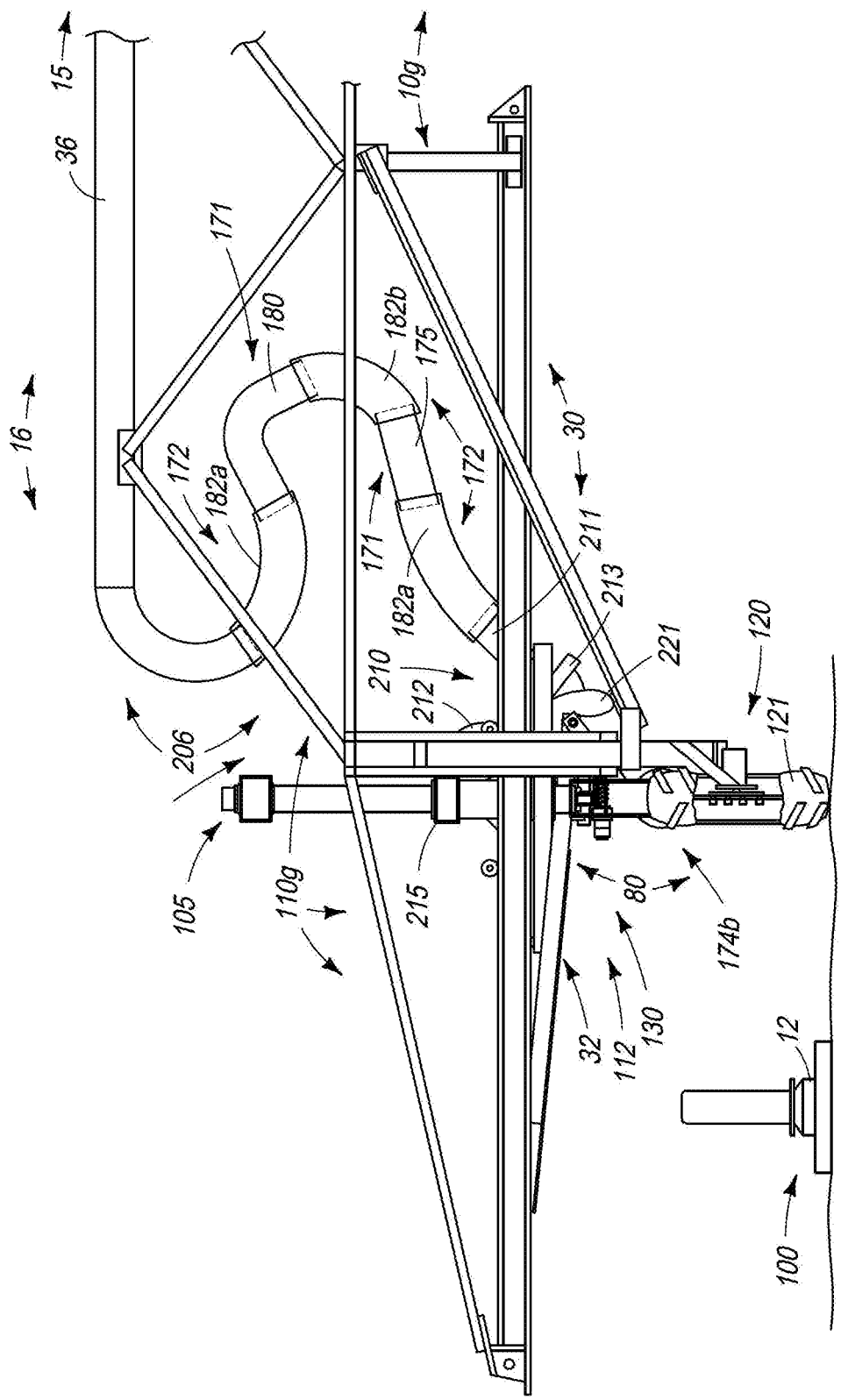
Figure 17D:
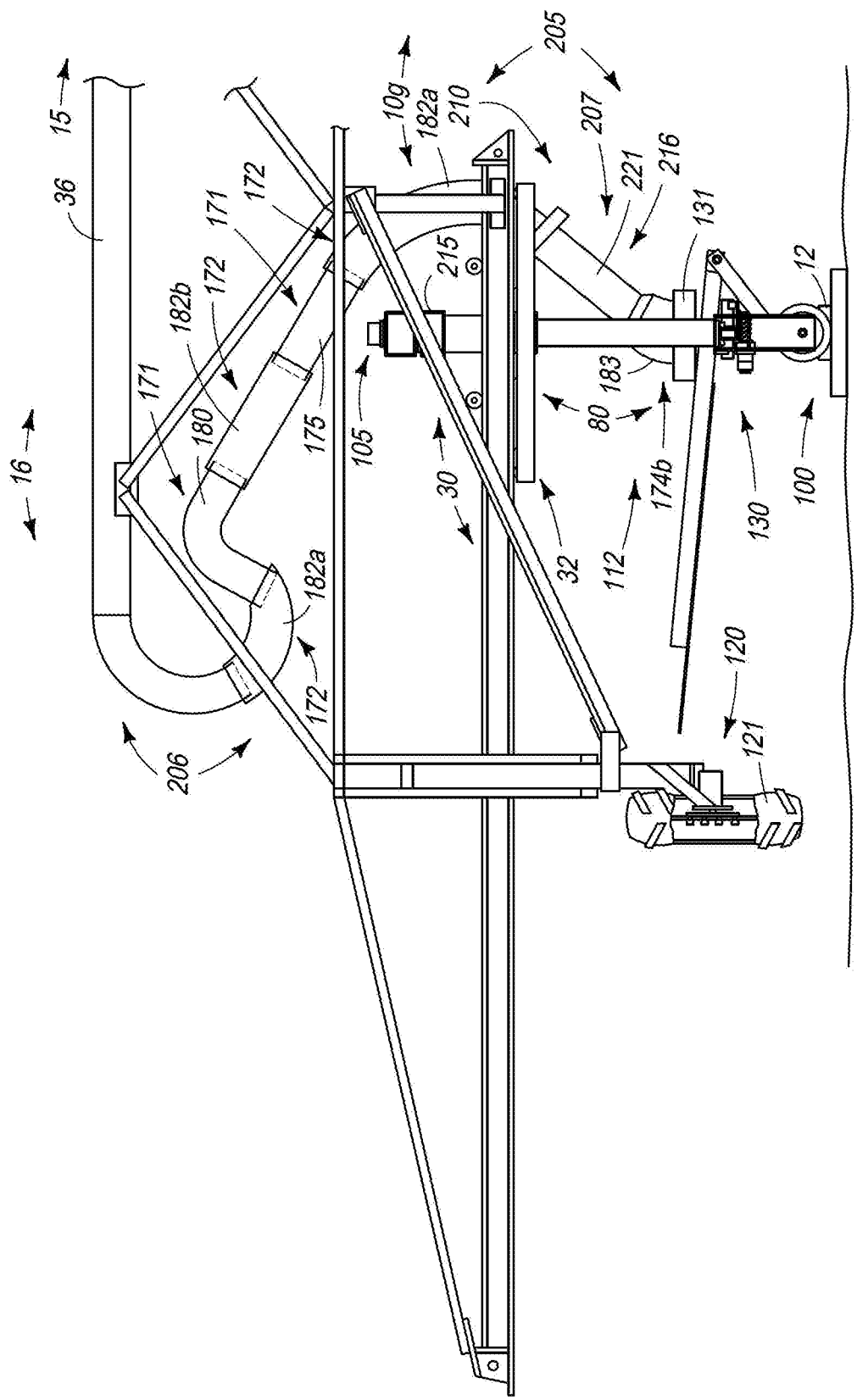

FIGS. 17a, 17b, 17c and 17d illustrate trolley supported conveyance 205 (of this seventh example of this first embodiment of system 10, system 10g) oriented in the same positioning extremes described prior for FIGS. 13a, 13b, 13c and 13d respectively. (FIG. 17a illustrates coupler body 131 positioned outermost along swing arm length adjuster 30. FIG. 17b illustrates coupler body 131 having reached the outer end of regulator 30 and has been disconnected from the access valve 12. FIG. 17c illustrates coupler body 131 having been moved inward along regulator 30 to the position shown for transport to a next access valve 12. FIG. 17d illustrates coupler body 131 having been connected to an access valve 12 with delivery pipe 15 having traveled causing body 131 to be moved innermost along regulator 30.) (FIG. 30 of U.S. Pat. No. 9,301,459 can be referenced as a generally accurate end view of FIGS. 17a through 17d, though conveyance 125 of this application is not there-represented.)

Shown in FIGS. 17a and 17d is collapsible hose 221 of coupler-to-trolley conduit 216 in a pressurized thus inflated state from the pressurized water being supplied from the connected-to access valve 12 delivered to hose 221 through coupler body 131. Shown in FIGS. 17b and 17c is collapsible hose 221 of coupler-to-trolley conduit 216 absent pressurize thus not inflated as coupler body 131 is not connected to access valve 12 and so pressurized water is not being supplied from the access valve 12. When coupler body 131 is lifted off of an access valve 12, the subsequent absence of pressure enables hose 221 to collapse and thus to bend freely which enables coupler body 131 to be lifted upward and to clear trolley conduit support 210.

It is understood that the above examples of the various embodiments provided for herein can be implemented using alternative means and structures to provided essentially equivalent functionality, and that the scope of the present invention is not to be limited by these examples.

I claim:

1. An apparatus configured to supply water to a linear-move water delivery pipe assembly, the apparatus comprising:
   a valve coupler;
   a swing arm configured to pivotably forward the valve coupler along a water main, the swing arm pivotably mounted to and hydraulically connected to the delivery pipe assembly and having an outer end remote from the delivery pipe assembly, wherein the valve coupler is mounted to the outer end of the swing arm and configured to selectively access water from the water main, the valve coupler further configured to be raised and lowered to achieve a next access of the water main;
   a swing arm length regulator mounted to the swing arm outer end and configured to accommodate a varying distance between the valve coupler's access to a stationary water main and linear-move travel of the delivery pipe assembly, the regulator enabling substantially horizontal coupler travel parallel to an axis through a length of the swing arm, and wherein the raise and lower of the valve coupler is relative to the swing arm length regulator;
   a water conveyance configured to operably flow water between the valve coupler and the swing arm and to maintain connection between the valve coupler and the swing arm during the raise, lower and horizontal travel of the coupler; and wherein the water conveyance comprises at least two of a rigid conduit and at least one of a flexible conduit.

2. The apparatus of claim 1 wherein the at least two of a rigid conduit comprises a curved conduit.

3. The apparatus of claim 2 wherein the water conveyance further comprises at least one of a conduit hinge configured to relieve load from one of the at least one flexible conduit.

4. The apparatus of claim 1 wherein the water conveyance further comprises a conduit hinge configured to relieve load from one of the at least one flexible conduit.

5. The apparatus of claim 1 wherein the water conveyance further comprises at least one of an offset hinge configured to relieve load from one of the at least one flexible conduit.

6. The apparatus of claim 1 wherein the water conveyance is configured to reside mostly on a side of the valve coupler away from the delivery pipe, the conveyance further comprising a flow router attached to the valve coupler to reroute upward water flow to a direction away from the delivery pipe.

7. The apparatus of claim 1 wherein the water conveyance is configured to reside mostly on a side of the valve coupler toward the delivery pipe, the conveyance further comprising flow router attached to the valve coupler to reroute upward water flow to a direction toward the delivery pipe and a flow router attached to the swing arm to reroute upward water flow in the conveyance into a top pipe of the swing arm.

8. The apparatus of claim 1 wherein the at least one flexible conduit comprises three flexible conduits and the conveyance further comprises three hinges, each hinge configured to relieve load from a respective one of the three flexible conduits.

9. The apparatus of claim 8 and wherein at least one of the three hinges comprises an offset hinge.

10. The apparatus of claim 8 and wherein the at least two of a rigid conduit comprises at least one of a curved conduit.

11. The apparatus of claim 8 wherein the water conveyance is configured to reside mostly on a side of the valve coupler toward the delivery pipe, the conveyance further comprising a flow router attached to the valve coupler to reroute upward water flow to a direction toward the delivery pipe and a flow router attached to the swing arm to redirect upward water flow in the conveyance into the swing arm.

12. The apparatus of claim 1 and wherein the swing arm length regulator comprises a trolley and the raise and lower of the valve coupler is also relative to the trolley and wherein the water conveyance connection between the valve coupler and the swing arm is maintained via the trolley.

13. The apparatus of claim 3 and wherein the swing arm length regulator comprises a trolley and the raise and lower of the valve coupler is also relative to the trolley and wherein the water conveyance connection between the valve coupler and the swing arm is maintained via the trolley.

14. The apparatus of claim 4 and wherein the swing arm length regulator comprises a trolley and the raise and lower of the valve coupler is also relative to the trolley and wherein the water conveyance connection between the valve coupler and the swing arm is maintained via the trolley.

15. The apparatus of claim 8 and wherein the swing arm length regulator comprises a trolley and the raise and lower of the valve coupler is also relative to the trolley and wherein the water conveyance connection between the valve coupler and the swing arm is maintained via the trolley.

16. An apparatus configured to supply water to a linear-move water delivery pipe assembly, the apparatus comprising:

a valve coupler;

a swing arm configured to pivotably forward the valve coupler along a water main, the swing arm pivotably mounted to and hydraulically connected to the delivery pipe assembly and having an outer end remote from the delivery pipe assembly, wherein the valve coupler is mounted to the outer end of the swing arm and configured to selectively access water from the water main, the valve coupler further configured to be raised and lowered to achieve a next access of the water main;

a swing arm length regulator mounted to the swing arm outer end and configured to accommodate a varying distance between the valve coupler's access to a stationary water main and linear-move travel of the delivery pipe assembly, the regulator enabling substantially horizontal coupler travel parallel to an axis through a length of the swing arm, and wherein the raise and lower of the valve coupler is relative to the swing arm length regulator;

a water conveyance configured to operably flow water between the valve coupler and the swing arm; and wherein the water conveyance comprises a flexible conduit connected between the valve coupler and the swing arm and residing substantially inside a hose cage with one end of the hose cage attached to the valve coupler and the other end attached to the swing arm.

17. An apparatus configured to supply water to a linear-move water delivery pipe assembly, the apparatus comprising:

a valve coupler;

a swing arm configured to pivotably forward the valve coupler along a water main, the swing arm pivotably mounted to and hydraulically connected to the delivery pipe assembly and having an outer end remote from the delivery pipe assembly, wherein the valve coupler is mounted to the outer end of the swing arm and configured to selectively access water from the water main, the valve coupler further configured to be raised and lowered to achieve a next access of the water main;

a swing arm length regulator mounted to the swing arm outer end and configured to accommodate a varying distance between the valve coupler's access to a stationary water main and linear-move travel of the delivery pipe assembly, the regulator enabling substantially horizontal coupler travel parallel to an axis through a length of the swing arm, and wherein the raise and lower of the valve coupler is relative to the swing arm length regulator;

a water conveyance configured to operably flow water between the valve coupler and the swing arm; and wherein the swing arm length regulator comprises a trolley and the raise and lower of the valve coupler is also relative to the trolley and wherein the water conveyance is further configured to maintain a connection between the valve coupler and the swing arm via the trolley during the raise, lower and horizontal travel of the coupler.

18. The apparatus of claim 17 wherein the water conveyance comprises at least two of a rigid conduit and at least one of a flexible conduit.

19. The apparatus of claim 17 wherein the water conveyance comprises at least two of a rigid conduit configured to reside between the swing arm and the trolley.

20. The apparatus of claim 17 wherein the valve coupler includes a coupler body and the water conveyance is configured attached to the coupler body and extending there from in a substantially upward direction.

\* \* \* \* \*